US012649868B2

(12) United States Patent　　(10) Patent No.:　US 12,649,868 B2
Amos et al.　　　　　　　　　　(45) Date of Patent:　　Jun. 9, 2026

(54) COEXTRUDED POLYMERIC ADHESIVE ARTICLE

(71) Applicant: 3M INNOVATIVE PROPERTIES COMPANY, St. Paul, MN (US)

(72) Inventors: David T. Amos, St. Paul, MN (US); Jeffrey O. Emslander, City of Grant, MN (US); Lacey M. Strand, St. Paul, MN (US); Edward E. Cole, Woodbury, MN (US); Jay M. Jennen, Forest Lake, MN (US); Rajdeep S. Kalgutkar, Woodbury, MN (US); Jilliann M. Nelson, Maplewood, MN (US); Jacob D. Young, St. Paul, MN (US); Robert D. Waid, Maplewood, MN (US); Doreen Eckhardt, Dormagen (DE); Daniel Zulkarnain, Cologne (DE)

(73) Assignee: 3M Innovative Properties Company, St. Paul, MN (US)

( * ) Notice: Subject to any disclaimer, the term of this patent is extended or adjusted under 35 U.S.C. 154(b) by 1057 days.

(21) Appl. No.: 17/636,731

(22) PCT Filed: Sep. 3, 2020

(86) PCT No.: PCT/IB2020/058222
§ 371 (c)(1),
(2) Date: Feb. 18, 2022

(87) PCT Pub. No.: WO2021/048713
PCT Pub. Date: Mar. 18, 2021

(65) Prior Publication Data
US 2022/0315807 A1　　Oct. 6, 2022

Related U.S. Application Data

(60) Provisional application No. 62/897,707, filed on Sep. 9, 2019.

(51) Int. Cl.
*C09J 7/29*　　　(2018.01)
*C09J 7/24*　　　(2018.01)
*C09J 7/25*　　　(2018.01)
*C09J 7/38*　　　(2018.01)

(52) U.S. Cl.
CPC ................. *C09J 7/29* (2018.01); *C09J 7/241* (2018.01); *C09J 7/25* (2018.01); *C09J 7/38* (2018.01); *C09J 2301/122* (2020.08); *C09J 2301/162* (2020.08); *C09J 2423/001* (2013.01); *C09J 2451/001* (2013.01); *C09J 2477/001* (2013.01); *Y10T 428/2843* (2015.01); *Y10T 428/2848* (2015.01); *Y10T 428/3175* (2015.04)

(58) Field of Classification Search
None
See application file for complete search history.

(56) References Cited

U.S. PATENT DOCUMENTS

| | | |
|---|---|---|
| RE24,906 E | 12/1960 | Ulrich |
| 3,027,337 A | 3/1962 | Tritsch |
| 3,164,488 A | 1/1965 | Workman |
| 3,377,303 A | 4/1968 | Peerman |
| 3,484,336 A | 12/1969 | Aulik |
| 3,772,262 A | 11/1973 | Clementi |
| 4,062,819 A | 12/1977 | Mains |
| 4,181,752 A | 1/1980 | Martens |
| 4,303,485 A | 12/1981 | Levens |
| 4,329,384 A | 5/1982 | Vesley |
| 4,330,590 A | 5/1982 | Vesley |
| 4,379,201 A | 4/1983 | Heilmann |
| 4,554,324 A | 11/1985 | Husman |
| 4,619,979 A | 10/1986 | Kotnou |
| 4,668,571 A | 5/1987 | Moriarty, Jr. |
| 4,693,776 A | 9/1987 | Krampe |
| 4,737,559 A | 4/1988 | Kellen |
| 4,843,134 A | 6/1989 | Kotnour |
| 4,845,168 A | 7/1989 | Dykes |
| 5,417,981 A | 5/1995 | Endo et al. |
| 5,447,789 A | 9/1995 | Griffin |
| 5,569,686 A | 10/1996 | Makati |
| 5,605,945 A | 2/1997 | Sayed |
| 5,637,646 A | 6/1997 | Ellis |

(Continued)

FOREIGN PATENT DOCUMENTS

| | | |
|---|---|---|
| CN | 1172723 A | 2/1998 |
| CN | 103827238 A | 5/2014 |

(Continued)

OTHER PUBLICATIONS

Sheth, et al., "Solid state structure-property behavior of semicrystalline poly(ether-block-amide) PEBAX® thermoplastic elastomers", Polymer, vol. 44, (2003) pp. 743-756.
"DuPontTMNucrel®30707", Nucrel® resins Product Data Sheet, DuPont Performance Materials, 2017, 3 pages.
"DuPont™ Bynel® 22E780", Bynel® resins Product Data Sheet, DuPont Packaging and Industrial Polymers, 2010, pp. 1-4.
"DuPont™ Bynel® E418", Bynel® resins Product Data Sheet, DuPont Packaging and Industrial Polymers, 2010, pp. 1-4.
"DuPont™ Nucrel® 3990", NucreIR resins Product Data Sheet, DuPont Packaging and Industrial Polymers, 2010, pp. 1-3.
"ExxonMobil™ PP7035E4", Polypropylene Impact Copolymer—Product Datasheet, ExxonMobil, 2012, pp. 1-2.
"Petrothene NA217000", Technical Data Sheet—Low Density Polyethylene, Lyondellbasell, Request #: 1021358, 2017, pp. 1-3.
"Vistamaxx™ 6102", Performance Polymer—Product Datasheet, ExxonMobil, 2017, pp. 1-2.

(Continued)

*Primary Examiner* — Anish P Desai

(74) *Attorney, Agent, or Firm* — Ann Benjamin

(57) ABSTRACT

An adhesive article including: a coextruded polymeric backing that includes: a first layer including an amorphous polyamide, the first layer having first and second opposing major surfaces; and a second layer including a polar-modified polyolefin, the second layer having first and second opposing major surfaces; wherein the first major surface of the second layer is in contact with the second major surface of the first layer; and an acrylic pressure sensitive adhesive layer in contact with the first major surface of the first layer of the backing.

13 Claims, 1 Drawing Sheet

(56) References Cited

U.S. PATENT DOCUMENTS

| | | | |
|---|---|---|---|
| 5,643,375 A | 7/1997 | Wilfong | |
| 5,650,482 A | 7/1997 | Raymond | |
| 5,804,610 A | 9/1998 | Hamer | |
| 5,807,966 A | 9/1998 | Pfaendner | |
| 6,008,313 A | 12/1999 | Walker | |
| 6,025,070 A | 2/2000 | Heederik | |
| 6,210,524 B1 * | 4/2001 | Josephy | B32B 27/32 |
| | | | 156/247 |
| 6,287,685 B1 | 9/2001 | Janssen | |
| 6,316,120 B1 | 11/2001 | Emslander | |
| 6,361,843 B1 | 3/2002 | Smith | |
| 6,432,530 B1 | 8/2002 | Garcia-Ramirez | |
| 6,572,971 B2 | 6/2003 | Martin | |
| 6,579,601 B2 * | 6/2003 | Kollaja | B32B 27/08 |
| | | | 428/354 |
| 6,720,387 B1 | 4/2004 | Stark | |
| 6,841,234 B2 | 1/2005 | Lhila | |
| 7,217,455 B2 | 5/2007 | Valdez | |
| 8,278,398 B2 | 10/2012 | Lutz | |
| 8,430,989 B2 | 4/2013 | Burckhardt | |
| 8,513,376 B2 | 8/2013 | Raymond | |
| 8,945,702 B2 | 2/2015 | Wuest | |
| 8,952,103 B2 | 2/2015 | Blondel | |
| 9,068,042 B2 | 6/2015 | Stroeks | |
| 9,187,678 B2 | 11/2015 | Boardman | |
| 9,296,917 B2 | 3/2016 | Misev | |
| 9,301,869 B2 | 4/2016 | Chang | |
| 10,005,925 B2 | 6/2018 | Hyde | |
| 2003/0049415 A1 | 3/2003 | Pedginski | |
| 2003/0077466 A1 | 4/2003 | Smith | |
| 2005/0244664 A1 * | 11/2005 | Bekele | B32B 27/08 |
| | | | 428/474.7 |
| 2006/0014035 A1 | 1/2006 | Montanari | |
| 2006/0228504 A1 | 10/2006 | Wilkie | |
| 2008/0124472 A1 | 5/2008 | Lau | |
| 2010/0210745 A1 | 8/2010 | McDaniel | |
| 2011/0076507 A1 | 3/2011 | Shearer | |
| 2012/0210745 A1 | 8/2012 | Ikeda | |
| 2014/0099537 A1 | 4/2014 | Kato | |
| 2015/0003752 A1 | 1/2015 | Venkataraman et al. | |
| 2016/0009698 A1 | 1/2016 | Julia Jane et al. | |
| 2017/0137562 A1 | 5/2017 | Zheng | |
| 2017/0144416 A1 | 5/2017 | Broadus | |
| 2017/0233605 A1 | 8/2017 | Erdodi | |
| 2017/0320301 A1 | 11/2017 | Dederichs et al. | |
| 2018/0305544 A1 | 10/2018 | Perez | |
| 2019/0002394 A1 | 1/2019 | Mkrtchyan et al. | |
| 2019/0134957 A1 | 5/2019 | Shallbetter | |

FOREIGN PATENT DOCUMENTS

| | | |
|---|---|---|
| CN | 104093806 A | 10/2014 |
| CN | 103351788 | 12/2015 |
| CN | 103602220 | 1/2016 |
| CN | 105229103 A | 1/2016 |
| CN | 105647336 | 6/2016 |
| CN | 106398461 | 2/2017 |
| CN | 104112393 | 5/2017 |
| CN | 105623198 | 2/2018 |
| CN | 106398465 | 8/2018 |
| CN | 106752718 | 11/2019 |
| CN | 106753131 | 10/2020 |
| EP | 0384598 | 12/1993 |
| EP | 0392847 | 7/1995 |
| EP | 0546709 | 6/1997 |
| EP | 0853092 | 7/1998 |
| EP | 0851799 | 3/2001 |
| EP | 0358038 | 8/2006 |
| EP | 2 873 706 A1 | 5/2015 |
| EP | 3446870 | 2/2019 |
| GB | 2073224 | 1/1984 |
| JP | 2813533 | 10/1998 |
| JP | 2012-161181 | 8/2012 |
| JP | 2016-124876 | 7/2016 |
| KR | 10-1553120 | 9/2015 |
| KR | 10-1768220 | 8/2017 |
| RO | 113352 | 6/1998 |
| WO | WO 2000-011173 | 3/2000 |
| WO | 2002080801 | 10/2002 |
| WO | 2002090403 | 11/2002 |
| WO | WO 2005-014406 | 2/2005 |
| WO | WO 2007-087271 | 8/2007 |
| WO | WO 2007-087281 | 8/2007 |
| WO | 2011091132 | 1/2011 |
| WO | WO 2013-011173 | 1/2013 |
| WO | WO 2013-178462 | 12/2013 |
| WO | WO 2014-010055 | 1/2014 |
| WO | WO 2014-100580 | 6/2014 |
| WO | WO 2015-200655 | 12/2015 |
| WO | WO 2015-200657 | 12/2015 |
| WO | WO 2015-200669 | 12/2015 |
| WO | WO 2016-025300 | 2/2016 |
| WO | WO 2016-100153 | 6/2016 |
| WO | WO 2017-078449 | 5/2017 |
| WO | WO 2017-136279 | 8/2017 |
| WO | WO 2017-136280 | 8/2017 |
| WO | WO 2018-050488 | 3/2018 |
| WO | WO 2018-063578 | 4/2018 |
| WO | WO 2018-122749 | 7/2018 |
| WO | WO 2018-207080 | 11/2018 |
| WO | WO 2019-069087 | 4/2019 |

OTHER PUBLICATIONS

"Vistamaxx™ 6202", Performance Polymer—Product Datasheet, ExxonMobil, 2017, pp. 1-2.

Breuer, "Dimer Acids", Kirk-Othmer Encyclopedia of Chemical Technology, published by John-Wiley and Sons, 2000, pp. 1-13.

Chen, "Polyamides Derived from Piperazine and used for Hot-Melt Adhesives; Synthesis and Properties", International Journal of Adhesion & Adhesives, 2002, vol. 22, pp. 75-79.

Dow: Amplify™ GR Functional Polymers, "Get Stuck on Improved Performance and Value", 2013, 4 pages.

Fang, "Rheological Effects of Polyethylenes in Film Blowing", Polymer Engineering and Science, Jul. 2003, vol. 43, No. 7, pp. 1391-1406.

Greiner, "Polyamide Resins (Nonnylon Types)", CEH Marketing Research Report, Chemical Economics Handbook—SRI Consulting, Aug. 2009, pp. 1-57.

Lee, Handbook of Epoxy Resins, 1967, 3 pages.

Beyer, "Chapter 14—Reactive Extrusion: Principles and Applications", Industrial Production and Use of Grafted Polyolefins, 2018, Wiley-VCH, 52 pages.

Satas, Handbook of Pressure Sensitive Adhesive Technology (1989), 9 pages.

Progelhof, R.C., and Thorne, J.L, Polymer Engineering Principles,., Hanser/Gardner Publications, Inc., Cincinnati, OH, 1993, pp. 405-431.

Updegraff, "Amorphous Polymers", Encyclopedia of Polymer Science and Engineering, 2nd Ed., J. Wiley & Sons, Inc., 1985, pp. 789-842.

Masters, K., Spray Drying: An Introduction to Principles, Operational Practice, and Application, $2^{nd}$ edition, Wiley, NY, 1976, pp. 74-93.

International Search Report for PCT International Application No. PCT/IB2020/058222, mailed on Nov. 20, 2020, 4 pages.

* cited by examiner

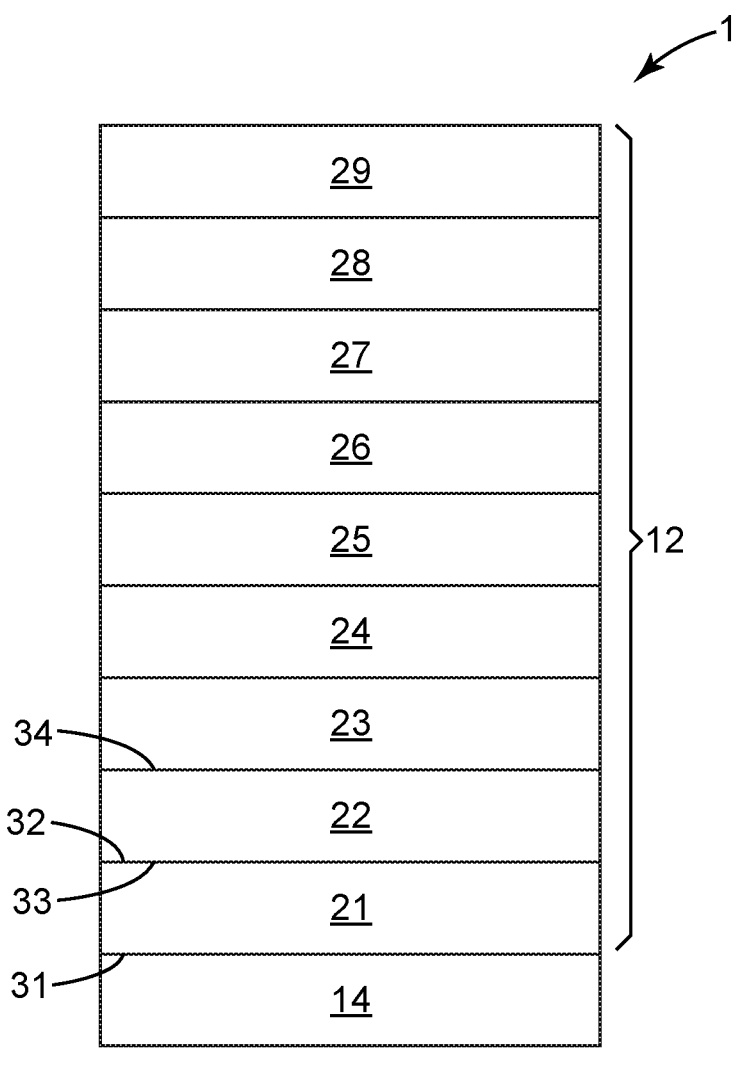

COEXTRUDED POLYMERIC ADHESIVE ARTICLE

CROSS REFERENCE TO RELATED APPLICATIONS

This application is a national stage filing under 35 U.S.C. § 371 of PCT/IB2020/058222, filed Sep. 3, 2020, which claims the benefit of Provisional Application No. 62/897,707, filed Sep. 9, 2019, the disclosure of which is incorporated by reference in its/their entirety herein.

BACKGROUND

Polymeric films are commonly used for many applications (e.g., as a backing support for pressure sensitive adhesive tapes). Increasingly polyolefinic materials such as polyethylene and polypropylene are being used as tape backings due to their improved physical properties relative to paper backings (e.g., to improve moisture resistance when used as masking tapes in contact with water based paints).

Polyolefinic materials are typically low surface energy materials and require the use of a liquid primer and additional surface treatment (e.g., corona or flame treatment) to allow anchorage of the desired pressure sensitive adhesive. This in turn typically involves an additional process step, and often the anchorage of the adhesive remains below the desired level for a functional tape.

Thus, there is a desire for a primer system to desirably anchor pressure sensitive adhesives to polyolefinic films. It is also desirable to have a process to produce such a backing that does not require a coating step or solvents.

SUMMARY

In one aspect, the present disclosure describes an adhesive article including a coextruded polymeric backing and an acrylic pressure sensitive adhesive layer disposed thereon. The polymeric backing (i.e., polymeric multilayer film) includes: a first layer including an amorphous polyamide, the first layer having first and second opposing major surfaces; and a second layer including a polar-modified polyolefin, the second layer having first and second opposing major surfaces; wherein the first major surface of the second layer is in contact with the second major surface of the first layer. The acrylic pressure sensitive adhesive layer is in contact with the first major surface of the first layer of the backing.

In certain embodiments, the polar-modified polyolefin includes a copolymer of ethylene and one or more polar comonomers. In certain embodiments, the polar-modified polyolefin includes a polyolefin with one or more grafted polar groups.

Herein, "amorphous polyamide" refers to a polyamide that has an enthalpy of fusion from the second heat ramp of a heat-cool-heat cycle not greater than 50 Joules per gram (J/g) as measured by differential scanning calorimetry (DSC). The enthalpy of fusion of a polyamide is measured by DSC on a differential scanning calorimeter (available under the trade designation Q200 SERIES DSC from TA Instruments, New Castle, DE) using a heat/cool/heat cycle procedure with the following parameters: Equilibrate at (−30.00° C.), then ramp heat at 20.00° C./minute to 200.00° C., then ramp cool at 20.00° C./minute to (−30.00° C.), then ramp heat at 20.00° C./minute to 200.00° C., with a data collection rate of one data point per second. The enthalpy of fusion is evaluated by a linear integration of the endothermic transition in the range of 35° C.-85° C. using commercial software (available under the trade designation UNIVERSAL ANALYSIS 2000 software from TA Instruments).

Herein, "copolymer" is defined as a polymer that includes two or more different monomers, including a terpolymer, tetrapolymer, and the like.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the present disclosure. Thus, the appearances of such phrases in various places throughout this specification are not necessarily referring to the same embodiment of the present disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples. These examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF FIGURES

FIG. 1 is a cross-sectional representation (which is not to scale) of an adhesive article of the present disclosure including a coextruded polymeric backing and an acrylic pressure sensitive adhesive layer disposed thereon.

DETAILED DESCRIPTION OF ILLUSTRATIVE EMBODIMENTS

In one aspect, the present disclosure describes an adhesive article including a coextruded polymeric backing and an acrylic pressure sensitive adhesive layer disposed thereon. The coextruded polymeric backing (i.e., polymeric multi-layer film) includes: a first layer including an amorphous polyamide, the first layer having first and second opposing major surfaces; and a second layer including a polar-modified polyolefin, the second layer having first and second opposing major surfaces; wherein the first major surface of the second layer is in contact with the second major surface of the first layer.

The acrylic pressure sensitive adhesive layer is in contact with the first major surface of the first layer of the backing, which is also the first major surface of the backing. The acrylic pressure sensitive adhesive is typically coated (e.g., melt coated) on the backing. Thus, the amorphous polyamide layer functions as a primer to anchor the acrylic pressure sensitive adhesive to the polar-modified polyolefin layer of the backing.

In certain embodiments, the polar-modified polyolefin includes a copolymer of an olefin and one or more polar comonomers. In certain embodiments, the polar-modified polyolefin includes a grafted polyolefin, which includes a polyolefin with one or more grafted polar groups. In certain embodiments, the polar-modified polyolefin includes an olefin, one or more polar comonomers, and one or more grafted polar groups. In certain embodiments, the polar-modified polyolefin includes ethylene, one or more polar comonomers, and one or more grafted polar groups.

In some embodiments, the coextruded polymeric backings described herein have an average thickness of at least 10 (in some embodiments, at least 15, at least 20, at least 25, at least 30, at least 35, at least 40, at least 45, at least 50, at least 55, at least 60, at least 65, at least 70, at least 75, or at least 100) micrometers. In some embodiments, the coextruded polymeric backings described herein have an average thickness of up to 500 (in some embodiments, up to 450, up to 400, up to 350, up to 300, up to 250, up to 200, or up to 150) micrometers. In some embodiments, the coextruded polymeric backings described herein have an average thickness in a range of 10 to 500 (in some embodiments, 20 to 500, 30 to 500, 30 to 400, or even 30 to 250) micrometers.

As shown in FIG. 1 (not to scale), one embodiment of an adhesive article 10 of the present disclosure includes a coextruded polymeric backing 12 and an acrylic pressure sensitive adhesive layer 14 disposed thereon. The coextruded polymeric backing 12 includes: a first layer 21 including an amorphous polyamide, which functions as a primer layer for the adhesive (i.e., adhesive primer), and a second layer 22 including a polar-modified polyolefin. Optionally, the coextruded polymeric backing may further include a third layer 23, a fourth layer 24, a fifth layer 25, a sixth layer 26, a seventh layer 27, an eighth layer 28, a ninth layer 29, etc. The first layer 21 has opposing first and second major surfaces 31 and 32, and the second layer 22 has opposing first and second major surfaces 33 and 34, wherein the first major surface 33 of the second layer 22 is in contact with the second major surface 32 of the first layer 21. The acrylic pressure sensitive adhesive layer 14 is in contact with the first major surface 31 of the first layer 21 of the backing 12. The first major surface of each subsequent layer is in contact with the second major surface of the previous layer. Exemplary adhesive articles (i.e., adhesive coated articles) include tapes, die-cut adhesive articles, and labels.

Backing

Coextruded polymeric backings (i.e., polymeric multi-layer films) described herein include: a first layer including an amorphous polyamide, the first layer having first and second opposing major surfaces; and a second layer including a polar-modified polyolefin, the second layer having first and second opposing major surfaces; wherein the first major surface of the second layer is in contact with the second major surface of the first layer.

In some embodiments, the first layer has an average thickness of at least 1 (in some embodiments, at least 2, at least 3, at least 4, at least 5, at least 10, or even at least 25) micrometer. In some embodiments, the first layer has an average thickness of up to 70 (in some embodiments, up to 60 or up to 50) micrometers. In some embodiments, the first layer has an average thickness in a range of 1 to 70 (in some embodiments, in a range of 2 to 70, 3 to 70, 3 to 60, or even 3 to 50) micrometers.

In some embodiments, the second layer has an average thickness of at least 1 (in some embodiments, at least 2, at least 3, at least 4, at least 5, at least 10, or even at least 25) micrometer. In some embodiments, the second layer has an average thickness of up to 70 (in some embodiments, up to 60 or up to 50) micrometers. In some embodiments, the second layer has an average thickness in a range of 1 to 70 (in some embodiments, in a range of 2 to 70, 3 to 70, 3 to 60, or even 3 to 50) micrometers.

In some embodiments, the amorphous polyamide is present in an amount of at least 50 (in some embodiments, in an amount of at least 60, at least 70, at least 80, or at least 90) weight percent, based on the total weight of the first layer. In some embodiments, the amorphous polyamide is present in an amount of up to 100 (in some embodiments, in an amount of up to 95) weight percent, based on the total weight of the first layer. In some embodiments, the amorphous polyamide is present in an amount in a range of 50 to 100 (in some embodiments, in an amount of 60 to 100, 70 to 100, 80 to 100, or even 90 to 100) weight percent, based on the total weight of the first layer.

Herein, "amorphous polyamide" refers to a polyamide that has an enthalpy of fusion from the second heat ramp of a heat-cool-heat cycle of no greater than 50 J/g as measured by differential scanning calorimetry (DSC). In certain embodiments, the amorphous polyamide has an enthalpy of fusion from the second heat ramp of a heat-cool-heat cycle of no greater than 40 J/g as measured by differential scanning calorimetry (DSC). In certain embodiments, the amorphous polyamide has an enthalpy of fusion from the second heat ramp of a heat-cool-heat cycle of at least 0 J/g as measured by differential scanning calorimetry (DSC). In certain embodiments, the amorphous polyamide (typically, a dimer acid-based polyamide) has an enthalpy of fusion from the second heat ramp of a heat-cool-heat cycle of at least 30 J/g as measured by differential scanning calorimetry (DSC).

In some embodiments, the amorphous polyamide is characterized by a glass-transition temperature (Tg) of up to 135° C. (in some embodiments, up to 100° C. or up to 80° C.) as measured on a dry sample by differential scanning calorimetry, according to ISO 11357, with a heating gradient of 10° C./min. In some embodiments, the amorphous polyamide is characterized by a Tg of at least −20° C. as measured on a dry sample by differential scanning calorimetry, according to ISO 11357, with a heating gradient of 10° C./min.

In certain embodiments, the first layer may contain a mixture of at least two different amorphous polyamides.

In some embodiments, the amorphous polyamide is at least one amorphous dimer acid-based polyamide. An exemplary amorphous dimer acid-based polyamide is described in U.S. Pat. Pub. No. 2018/0305544 (Perez et al.).

In some embodiments, the amorphous polyamide is an amine-terminated polyamide resin. An exemplary amine-terminated polyamide resin is described in U.S. Pat. No. 3,377,303 (Peerman, et al.).

Amorphous polyamides are available, for example, under the trade designations UNI-REZ from Kraton Polymers LLC, Houston, TX, and TECHNOMELT Henkel AG & Co. KGaA, Dusseldorf, Germany. The amorphous polyamides have amine numbers, related to the polyamide end groups, in a range of 0.03 to 2.00 (in some embodiments, in a range of 0.05 to 1.00, or even 0.10 to 0.50) milliequivalents per gram (meq/gm). The amorphous polyamides have acid numbers, related to the polyamide end groups, in a range of greater than 0.00 and up to 0.20 (in some embodiments, in a range of 0.01 to 0.10, or even 0.01 to 0.05) meq/gm. Examples of amorphous polyamides include those available, for example, under the trade designations UNI-REZ 2291, UNI-REZ 2635, UNI-REZ 2638, and UNI-REZ 2651 from Kraton Polymers LLC, and TECHNOMELT 2279 and TECHNOMELT 6240 from Henkel AG & Co. KGaA.

In some embodiments, the amorphous polyamide includes an amorphous epoxide chain extended polyamide. Exemplary amorphous epoxide chain extended polyamides can be made as is known in the art. In some embodiments, the amorphous epoxide chain extended polyamide includes up to 2.5 (in some embodiments, up to 2, or even up to 1.5) percent by weight epoxy, based on the total weight of the amorphous epoxide chain extended polyamide. In some embodiments, the amorphous epoxide chain extended polyamide includes at least 0.1 (in some embodiments, at least 0.2, at least 0.25, at least 0.5, at least 0.7, at least 1, or even greater than 1) percent by weight epoxy, based on the total weight of the amorphous epoxide chain extended polyamide. In some embodiments, the amorphous epoxide chain extended polyamide includes 0.1 to 2.5 (in some embodiments, 0.2 to 2.5, 0.25 to 2.5, 0.5 to 2.5, 0.5 to 2, 0.5 to 1.5, 0.7 to 1.5, 1 to 2.5, or greater than 1 and up to 2.5) percent by weight epoxy, based on the total weight of the amorphous epoxide chain extended polyamide.

In some instances, it is advantageous to react a portion of the amine end groups of the amorphous polyamide with diepoxide resins as described, for example, in U.S. Pat. No. 6,008,313 (Benson et al.). The reaction of the amine end groups and the diepoxide resin can be conducted in the presence or absence of solvent, although processing in the absence of solvent is preferred. The amorphous epoxide chain extended polyamide may provide improved extrusion processing when compared to amorphous polyamides that are not chain extended. The portion of amine end groups that are reacted with the diepoxide resin can be adjusted to provide improved extrusion processing. Exemplary diepoxide resins include the diglycidyl ethers of bisphenol-A, the advanced diglycidyl ethers of bisphenol-A, and the diglycidyl ethers of bisphenol-F. Additional examples of useful diepoxide resins may be found in the "Handbook of Epoxy Resins," Henry Lee and Kris Neville, McGraw-Hill, 1967. Examples of diepoxide resins include that available, for example, under the trade designations EPON RESIN 828 from Hexion Incorporated, Columbus, OH, and D.E.R. 661 from Olin Corporation, Clayton, MO.

In some embodiments, the amorphous polyamide is blended with one or more other polymers, such that the amorphous polyamide is present in an amount of at least 50 (in some embodiments, in an amount of at least 60, at least 70, at least 80, or at least 90) weight percent, based on the total weight of the first layer. Suitable polymers for blending with the amorphous polyamide in the first layer of the backing include a copolymer of an olefin (e.g., ethylene, propylene, or a mixture thereof) and one or more polar comonomers as described herein for the second layer.

The second layer of the coextruded polymeric backings (i.e., polymeric multilayer films) includes a polar-modified polyolefin. In this context, "polar-modified" means an olefin-containing polymer containing one or more polar comonomers, one or more polar groups grafted to an olefin-containing backbone, or a combination thereof. In certain embodiments, the polar-modified polyolefin includes a copolymer of an olefin (e.g., ethylene, propylene, or a mixture thereof) and one or more polar comonomers. In certain embodiments, the polar-modified polyolefin includes a polyolefin (e.g., polyethylene, polypropylene, or a mixture thereof) with one or more grafted polar groups. In certain embodiments, the polar-modified polyolefin includes an olefin (e.g., ethylene, propylene, or a mixture thereof), one or more polar comonomers, and one or more grafted polar groups. In certain embodiments, the polar-modified polyolefin includes ethylene, one or more polar comonomers, and one or more grafted polar groups.

In some embodiments, the polar-modified polyolefin is present in an amount of at least 60 (in some embodiments, in an amount of at least 70, at least 80, or at least 90) weight percent, based on the total weight of the second layer. In some embodiments, the polar-modified polyolefin is present in an amount of up to 100 (in some embodiments, in an amount of up to 95) weight percent, based on the total weight of the second layer. In some embodiments, the polar-modified polyolefin is present in an amount in a range of 60 to 100 (in some embodiments, in an amount of 70 to 100, 80 to 100, or even 90 to 100) weight percent, based on the total weight of the second layer.

In certain embodiments, coextruded polymeric backings (i.e., polymeric multilayer fims) described herein include: a first layer including an amorphous polyamide, the first layer having first and second opposing major surfaces; and a second layer including a copolymer of an olefin (e.g., ethylene, propylene, or a mixture thereof) and one or more polar comonomers, the second layer having first and second opposing major surfaces; wherein the first major surface of the second layer is in contact with the second major surface of the first layer. In certain embodiments, the copolymer of an olefin and one or more polar comonomers is a copolymer of ethylene and one or more polar comonomers.

In some embodiments, the olefin (e.g., ethylene, propylene, or a mixture thereof) to polar comonomer weight ratio is in a range of 97:3 to 70:30 (in some embodiments, in a range of 96:4 to 75:25, 96:4 to 80:20, 95:5 to 75:25, 95:5 to 80:20, or even 95:5 to 85:15).

In certain embodiments, the olefin is selected from the group of ethylene, propylene, and a combination thereof.

In some embodiments, the polar comonomer is at least one of vinyl acetate, methyl acetate, acrylic acid, methacrylic acid, methyl acrylate, ethyl acrylate, butyl acrylate, glycidyl methacrylate, and carbon monoxide. Mixtures of such polar comonomers may be used if desired, thereby forming terpolymers, tetrapolymers, etc., such as ethylene/methyl acrylate/acrylic acid.

Ethylene/vinyl acetate (EVA) copolymers are commercially available from various suppliers including DuPont Packaging and Industrial Polymers under the trade designations ELVAX 750, ELVAX 550, and ELFAX 350. Ethylene/acrylic acid (EAA) copolymers are available from various suppliers such as Dow under the trade designation PRIMACOR 1410 or PRIMACOR 3460. Ethylene/methacrylic acid copolymers are available from various suppliers such as DuPont Packaging and Industrial Polymers under the trade designations NUCREL 0403 and NUCREL 0903. Other ethylene-containing copolymers including two or more polar monomers are commercially available from various suppliers including DuPont Packaging and Industrial Polymers under the trade designations BYNEL E418 and ELVALOY 741. Illustrative copolymers of an olefin and one or more polar comonomers are exemplified in the Examples Section as Resins A, B, C, E, G, J, and K.

In certain embodiments, coextruded polymeric backings (i.e., polymeric multilayer fims) described herein include: a first layer including an amorphous polyamide, the first layer having first and second opposing major surfaces; and a second layer including a grafted polyolefin including a polyolefin (e.g., polyethylene, polypropylene, or a mixture thereof) and one or more grafted polar groups, the second layer having first and second opposing major surfaces; wherein the first major surface of the second layer is in contact with the second major surface of the first layer.

In certain embodiments, the grafted polar groups are present in an amount of at least 0.1 wt-% (in some embodiments, at least 0.5 wt-%, or at least 1 wt-%), based on the total weight of the grafted polyolefin. In certain embodiments, the grafted polar groups are present in an amount of up to 8 wt-% (in some embodiments, up to 5 wt-%, or up to 2 wt-%), based on the total weight of the grafted polyolefin.

In certain embodiments, the polyolefin is selected from the group of polyethylene, polypropylene, and a combination thereof.

In certain embodiments, the grafted polar groups include maleic anhydride groups, thereby forming maleic anhydride grafted polyolefins (e.g., maleic anhydride grafted ethylene and/or maleic anhydride grafted propylene). Grafted polyolefins are well-known and are described, for example, in "Reactive Extrusion: Principles and Applications," Gunter Beyer and Christian Hopmann, Eds., Chapter 14, Inno Rapthel et al., Industrial Production and Use of Grafted Polyolefins, pages 375-405, first published Oct. 6, 2017, available at http://onlinelibrary.wiley.com/doi/pdf/10.1002/9783527801541.ch14. An illustrative polyolefin having one or more grafted polar groups is exemplified in the Examples Section as Resin M.

In certain embodiments, a polar-modified polyolefin may include one or more polar comonomers, grafted polar groups, or both. An illustrative copolymer of an olefin and one or more polar comonomers that also includes one or more grafted polar groups is exemplified in the Examples Section as Resin L.

In certain embodiments, the second layer may contain a mixture of at least two different polar-modified polyolefins. In certain embodiments, the at least two different polar-modified polyolefins may each independently include different polar comonomers, different grafted polar groups, or both. In certain embodiments, the at least two different polar-modified polyolefins may each independently include the same polar comonomers and/or grafted polar groups but with different levels.

In some embodiments, the polar-modified polyolefin is blended with one or more other polymers, such that the polar-modified polyolefin is present in an amount of at least 60 (in some embodiments, in an amount of at least 70, at least 80, or at least 90) weight percent, based on the total weight of the second layer. Suitable polymers for blending with the polar-modified polyolefin in the second layer of the backing include a polyolefin (e.g., ethylene, propylene, or a mixture thereof).

In some embodiments, the coextruded polymeric backings (i.e., polymeric multilayer fims) further include a third layer disposed on the second layer, the third layer having first and second opposing major surfaces. In some embodiments, the first major surface of the third layer contacts the second major surface of the second layer. The polar-modified polyolefin of the second layer functions as a tie layer for the amorphous polyamide to this third layer.

In some embodiments, the coextruded polymeric backings (i.e., polymeric multilayer fims) further include a fourth layer disposed on the third layer, the fourth layer having first and second opposing major surfaces. In some embodiments, the first major surface of the fourth layer contacts the second major surface of the third layer. In some embodiments, the coextruded polymeric backings (i.e., polymeric multilayer films) further include a fifth layer disposed on the fourth layer, the fifth layer having first and second opposing major surfaces. In some embodiments, the first major surface of the fifth layer contacts the second major surface of the fourth layer. In some embodiments, the coextruded polymeric backings (i.e., polymeric multilayer films) further include a sixth layer disposed on the fifth layer, the sixth layer having first and second opposing major surfaces. In some embodiments, the first major surface of the sixth layer contacts the second major surface of the fifth layer. In some embodiments, the coextruded polymeric backings (i.e., polymeric multilayer films) further include a seventh layer disposed on the sixth layer, the seventh layer having first and second opposing major surfaces. In some embodiments, the first major surface of the seventh layer contacts the second major surface of the sixth layer. In some embodiments, the coextruded polymeric backings (i.e., polymeric multilayer films) further include an eighth layer disposed on the seventh layer, the eighth layer having first and second opposing major surfaces. In some embodiments, the first major surface of the eighth layer contacts the second major surface of the seventh layer. In some embodiments, the coextruded polymeric backings (i.e., polymeric multilayer films) further include a ninth layer disposed on the eighth layer, the ninth layer having first and second opposing major surfaces. In some embodiments, the first major surface of the ninth layer contacts the second major surface of the eighth layer.

In some embodiments, the third, fourth, fifth, sixth, seventh, eighth, ninth (or additional) layer(s), to the extent present, independently has an average thickness of at least 1 (in some embodiments, at least 2, at least 3, at least 4, at least 5, at least 10, or even at least 25) micrometer. In some embodiments, the third, fourth, fifth, sixth, seventh, eighth, ninth (or additional) layer(s), to the extent present, independently has an average thickness of up to 70 (in some embodiments, up to 60 or up to 50) micrometers. In some embodiments, the third, fourth, fifth, sixth, seventh, eighth, ninth (or additional) layer(s), to the extent present, independently has an average thickness in a range of 1 to 70 (in some embodiments, in a range of 2 to 70, 3 to 70, 3 to 60, or even 3 to 50) micrometers.

In some embodiments, the third, fourth, fifth, sixth, seventh, eighth, ninth (or additional) layer(s), to the extent present, independently includes a polar-modified polyolefin as described herein for the second layer. In some embodiments, the third, fourth, fifth, sixth, seventh, eighth, ninth (or additional) layer(s), to the extent present, independently includes at least one of the following polymers: acrylic (e.g., poly(methyl)methacrylate (PMMA)), melamine, polyolefin (e.g., polyethylene), polycarbonate, polyvinyl butyral, polyester (e.g., polyethylene terephthalate), polyvinyl (e.g., vinyl, polymeric materialized vinyl, reinforced vinyl, vinyl/acrylic blends), polyvinyl halide (e.g., poly(vinyl chloride) and poly(vinyl fluoride)), urethane, a copolymer thereof (e.g., polyethylene copolymers, e.g., ethyl vinyl acetate (EVA), ethyl methyl acetate (EMA), and ethylene-co-acrylic acid (EAA)), maleic anhydride grafted polyolefin (e.g., maleic anhydride grafted ethylene polymer and/or maleic anhydride grafted propylene). Exemplary such polymers are available, for example, under the trade designations BYNEL 3101 (acid/acrylate-modified ethylene vinyl acetate (EVA) resin), NUCREL 3990 (ethylene acrylic acid copolymer resin), and ELVAX 3124 (ethylene vinyl acetate copolymer resin) available from E.I. duPont De Nemours, Wilmington DE Illustrative examples of materials suitable for use in the third, fourth, fifth, sixth, seventh, eighth, ninth (or additional) layer(s), to the extent present, are exemplified in the Examples Section as Resins A, B, C, D, E, F, H, I, and N, as well as combinations thereof.

In some embodiments, the third, fourth, fifth, sixth, seventh, eighth, ninth (or additional) layer(s), to the extent present, independently includes one or more of such polymers in an amount of at least 60 (in some embodiments, in an amount of at least 70, at least 80, or at least 90) weight percent, based on the total weight of the respective layer. In some embodiments, the third, fourth, fifth, sixth, seventh, eighth, ninth (or additional) layer(s), to the extent present, independently includes one or more of such polymers in an amount of up to 100 (in some embodiments, in an amount of up to 95) weight percent, based on the total weight of the respective layer. In some embodiments, the third, fourth, fifth, sixth, seventh, eighth, ninth (or additional) layer(s), to the extent present, independently includes one or more of such polymers in an amount in a range of 60 to 100 (in some embodiments, in an amount of 70 to 100, 80 to 100, or even 90 to 100) weight percent, based on the total weight of the respective layer.

In some embodiments, at least one layer of the coextruded polymeric backings (i.e., polymeric multilayer films) described herein includes an ultraviolet (UV) absorber. A UV absorbing layer (e.g., a UV protective layer) can aid in protecting other layers or substrates from UV-light caused damage/degradation over time by absorbing UV-light (in some embodiments, any UV-light).

In some embodiments, the UV absorbers are red shifted UV absorbers (RUVA) that absorb at least 70% (in some embodiments, at least 80%, or even at least 90%) of the UV light in the wavelength region from 180 nanometers (nm) to 400 nm. Typically, it is desirable that the RUVA be highly soluble in polymers, highly absorptive, photo-permanent, and thermally stable in at least the temperature range from 200° C. to 300° C. for extrusion process to form the protective layer. In some embodiments, a RUVA is copolymerizable with monomers to form a protective coating layer by at least one of free radical initiator curing, UV curing, gamma ray curing, e-beam curing, or thermal curing processes. Exemplary UVAs are UVA oligomers as described, for example, in PCT Pub. Nos. WO 2014/10055A1 (Olson et. al.), WO 2014/100580A1 (Olson et. al.), WO 2015/200655 (Olson et. al.), WO 2015/200669 (Olson et. al.), and WO 2015/200657 (Olson et. al.).

RUVAs typically have enhanced spectral coverage in the long-wave UV region (i.e., 300 nm to 400 nm), enabling them to block the high wavelength UV light that can cause yellowing in most polymers. Typical UV protective layers have thicknesses in a range from 13 micrometers to 380 micrometers with a RUVA loading level in a range from 2-10 percent by weight (wt-%). Exemplary RUVAs include benzotriazole compound, 5-trifluoromethyl-2-(2-hydroxy-3-alpha-cumyl-5-tert-octylphenyl)-2H-benzotriazole (available under the trade designation "CGL-0139" from BASF Corporation, Florham, NJ), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2-(-4,6- diphenyl-1-3,5-triazin-2-yl)-5-hexyloxy-phenol. RUVAs are also available, for example, from BASF Corporation under the trade designations TINUVIN 1577, TINUVIN 1600, and TINUVIN 777. Other exemplary UV absorbers are available, for example, in a polymethylmethacrylate (PMMA) UVA masterbatch from Sukano Polymers Corporation, Duncan, SC, under the trade designations TA11-10 MB03.

In some embodiments, at least one layer of the coextruded polymeric backings (i.e., polymeric multilayer films) described herein includes a hindered amine light stabilizer (HALS). Exemplary HALS include those available from BASF Corporation under the trade designations CHIMASSORB 944 and TINUVIN 123. Another exemplary HALS is available, for example, from BASF Corp., under the trade designation TINUVIN 944.

In some embodiments, at least one layer of the coextruded polymeric backings (i.e., polymeric multilayer films) described herein includes an antioxidant. Antioxidants can reduce or prevent degradation of the color development, and the physical and mechanical properties of the polymeric multilayer film. Exemplary antioxidant materials include those available, for example, under the trade designations CYANOX 1790 and CYANOX 2777 from Cytec Solvay Group, Woodland Park, NJ, or under the trade designations IRGANOX 1010 and ULTRANOX 626 from BASF Corporation.

In some embodiments, at least one layer of the coextruded polymeric backings (i.e., polymeric multilayer films) described herein includes a hydrophilic material (e.g., surfactant). Hydrophilic additives can increase absorption of aqueous liquids. This may be useful, for example, for cleaning products to absorb spills and aqueous cleaning agents, and for medical applications to absorb body fluids. Exemplary hydrophilic materials include an anionic surfactant, available, for example, under the trade designation JDOSS 50P from JLK Industries, Coopersburg, PA, or a non-ionic surfactant (PEG-5 Cocamide), available, for example, under the trade designation HETOXAMIDE C4 from Global 7 Industries, Franklin, NJ.

In some embodiments, at least one layer of the coextruded polymeric backings (i.e., polymeric multilayer films) described herein includes at least one antistatic agent. Antistatic agents can, for example, reduce dust and dirt attraction to finished products, reduce sparks through discharges, reduce ignition of flammable liquid and gas, reduce damage to electronic microcircuits, and reduce jamming of transport equipment. Exemplary antistatic agents include those available under the trade designations CTASTAT 609 and CYASTAT SN from Cytec Solvay Group, Woodland Park, NJ.

In some embodiments, at least one layer of the coextruded polymeric backings (i.e., polymeric multilayer films) described herein includes a release agent. Exemplary release agents include at least one of an alkyl dimethicone, a polyvinyl octadecyl carbamate, or an ethylene bis-stearamide. Alkyl dimethicones, are described, for example, in U.S. Pat. No. 9,187,678 (Boardman et al.). A polyvinyl octadecyl carbamate is available, for example, under the trade designation ESCOAT P-77 (a polyvinyl octadecyl carbamate in a linear, low density carrier resin) from Mayzo, Inc., Suwanee, GA. An ethylene bis-stearamide is available, for example, under the trade designation AMPACET 100666 from Ampacet Corporation, Tarrytown, NY.

Pressure sensitive adhesive tapes, or adhesive tapes, are often provided in roll form, wherein the tape construction includes a backing, an adhesive layer on one major side of the backing, and a release layer on the other major side of the backing. The release layer allows the tape to be unwound from the roll at a controlled level. Other articles having release characteristics are employed in a variety of applications. Any adhesive coated article, including tapes, die-cut adhesive articles, and labels, require, as a matter of practicality, a release coating or a separate release liner. The release coating or liner provides a surface to which the article does not permanently adhere.

In some embodiments, at least one layer of the coextruded polymeric backings (i.e., polymeric multilayer films) described herein includes at least one of a slip additive or an antiblocking agent.

Slip additives can modify the surface properties of a film, lowering the friction between film layers and other surfaces. To be effective, the slip additive needs to migrate out of the polymer to the surface and therefore, it needs have a degree of incompatibility with the polymer.

Exemplary slip additives include fatty acid amides such as erucamide or oleamide. During processing, for example, slip additives solubilize in the amorphous melt, but as the polymer cools and crystallizes, the fatty acid amide is "squeezed" out forming a lubricating layer at the polymer surface. The addition of a slip additive can reduce or prevent film sticking and pulling, helping to increase throughput. Exemplary slip additives are available, for example, under the trade designations AMPACET 100497 (a masterbatch containing 1 wt-% erucamide, in low density polyethylene carrier resin); and #10358 (a masterbatch of 5 wt-% oleamide, in a polyethylene carrier) from Ampacet Corporation, Tarrytown, NY.

An antiblock agent (i.e., antiblocking agent) can reduce or prevent blocking of layers. Polyolefin and other plastic films have a tendency to adhere together, often making it difficult to separate layers. This adhesion between film layers, called blocking, is an inherent property of some polymers. Antiblocking additives can be added to the film to minimize this adhesion and lower the blocking force between layers. Once compounded into a plastic, these additives create a micro-rough surface, which reduces the adhesion between film layers and lowers the blocking tendency. Exemplary antiblock agents are typically inorganic materials such as diatomaceous earth, talc, calcium carbonate, clay, mica and ceramic spheres. An exemplary antiblock agent is available, for example, under the trade designations ABC5000 from Polyfil Corporation, Rockaway, NJ; and AMPACET 102077 from Ampacet Corp.

In some embodiments, at least one layer of the coextruded polymeric backings (i.e., polymeric multilayer films) described herein includes an abrasion resistant material. Abrasion resistant materials may be added to reduce scratching, marring and abrasion of the finished product. An exemplary abrasion resistant additive is available, for example, under the trade designation MB25-381 (a masterbatch containing a siloxane polymer) from Dow Corning, Auburn, MI.

In some embodiments, at least one layer of the coextruded polymeric backings (i.e., polymeric multilayer films) described herein includes at least one of a dye or pigment (e.g., imparting a color such as white, yellow, green, blue, red, orange, brown, black, etc.). Exemplary dyes include those available, for example, under the trade designation CLARIANT REMAFIN PE63421213-ZN (a green dye masterbatch) from Clariant International AG, Muttenz, Switzerland. Exemplary pigments include titanium dioxide, zinc oxide, and zirconium dioxide. An exemplary pigment, available as masterbatch of titanium dioxide pigment in a polyolefin carrier, under the trade designation #11937 from Standridge Color Corporation, Social Circle, GA.

In some embodiments, at least one layer of the coextruded polymeric backings (i.e., polymeric multilayer films) described herein includes at least one of an ink or paint receptive material. Ink receptive materials can be desirable for adding an informational or decorative element to a film to improve the functionality or aesthetics of the film. Exemplary receptive materials include, for example, ethylene/vinyl acetate/carbon monoxide terpolymer, as described, for example, in U.S. Pat. No. 6,316,120 (Emslander).

In some embodiments, at least one layer of the coextruded polymeric backings (i.e., polymeric multilayer films) described herein includes metallic (e.g., aluminum, bronze, stainless steel, zinc, iron, tin, silver, gold, and/or titanium) particles. Metallic particles can provide unique decorative aspects, such as sparkle or pearlescence to films. An exemplary metallic particle additive is available, for example, under the trade designation PELLEX A240-50 (a metallic glitter masterbatch) from The Cary Company, Addison, IL.

The backing layers can be coextruded using techniques known in the art, including those described in "Polymer Engineering Principles," Progelhof, R. C., and Throne, J. L., Hanser/Gardner Publications, Inc., Cincinnati, OH, 1993.

Acrylic Pressure Sensitive Adhesives

In some embodiments, the pressure sensitive adhesive (PSA) layer, which may be a melt coated layer, includes one or more acrylic polymers. The PSA should have physical properties in accordance with those described in the "Handbook of Pressure Sensitive Adhesive Technology (2.sup.nd Edition)" by Donatas Satas (van Nostrand, New York, 1989).

In some embodiments, the acrylic pressure sensitive adhesive layer includes one or more acrylic polymers having a homopolymer or copolymer glass transition temperature (Tg) of less than 0° C.

In some embodiments, the pressure sensitive adhesive has a coating weight of less than 25 grams per square meter (g/m²). If desired, the pressure sensitive adhesive layer may have a coating weight less than 21 g/m², less than 17 g/m², less than 13 g/m², or even less than 9 g/m².

In some embodiments, the acrylic polymers have a molecular weight of at least 200,000 Daltons. In some embodiments, the acrylic polymers may have a collective molecular weight of at least 500,000 Daltons, at least 800,000 Daltons, or at least 1,000,000 Daltons.

In some embodiments, the pressure sensitive adhesive layer includes one or more hot melt coatable (meth)acrylic ester (co)polymers. Such hot melt coatable (meth)acrylic ester (co)polymers contain one or more low Tg (meth) acrylate monomers. Herein, a low Tg (meth)acrylate monomer is an acrylate or methacrylate monomer wherein the homopolymer of such monomer has a Tg of less than 20° C. Examples of useful low Tg (meth)acrylate monomers include those having the following general Formula (I):

$$H_2C=C(R^1)-C(O)-R^2$$

wherein $R^1$ is H or $CH_3$. An acrylate monomer is indicated when $R^1$ is H and a methacrylate monomer is indicated when $R^1$ is $CH_3$. $R^2$ is broadly selected from linear, branched, aromatic, or cyclic hydrocarbon groups. Preferably, $R^2$ is a linear or branched hydrocarbon group. The number of carbon atoms in the hydrocarbon group is preferably 1 to 20, and more preferably 1 to 18. When $R^2$ is a hydrocarbon group it can also include heteroatoms (e.g., oxygen or sulfur).

In some embodiments, useful low Tg (meth)acrylate monomers include mono-functional unsaturated monomers selected from the group of (meth)acrylate esters of nontertiary alkyl alcohols, the alkyl groups of which include 1 to 18, or 4 to 12 carbon atoms.

Examples of suitable low Tg (meth)acrylate monomers useful in the present disclosure include, but are not limited to, benzyl acrylate, n-butyl acrylate, n-butyl methacrylate, sec-butyl acrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, 2-ethylhexyl methacrylate, n-hexadecyl methacrylate, n-hexyl methacrylate, isoamyl acrylate, isobutyl acrylate, isodecyl acrylate, isodecyl methacrylate, isononyl acrylate, isooctyl acrylate, isooctyl methacrylate, isopropyl acrylate, isotridecyl acrylate, lauryl acrylate, lauryl methacrylate, 2-methoxy ethyl acrylate, methyl acrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-octyl acrylate, 2-octyl methacrylate, 2-phenoxy ethyl methacrylate, propyl acrylate, n-tetradecyl acrylate, n-tetradecyl methacrylate, and mixtures thereof. In some embodiments, the pressure sensitive adhesive layer includes acrylic polymers selected from the group of polymers and copolymers of isooctyl acrylate.

In some embodiments, the pressure sensitive adhesive layer includes hot melt coatable (meth)acrylic ester (co) polymers that include one or more high Tg monomers copolymerized with the low Tg monomers described herein. The high Tg monomers of the present disclosure are preferably mono-ethylenically unsaturated monomers having a homopolymer Tg greater than 20° C. In some embodiments, the high Tg monomers have a homopolymer Tg of greater than 50° C. Examples of suitable high Tg monomers include, but are not limited to, substituted lower (C1 to C4) alkyl methacrylates such as methyl methacrylate, ethyl methacrylate and tert-butyl methacrylate; n-hexadecyl acrylate, n-hexyl acrylate, 2-hydroxyethyl methacrylate and isobutyl methacrylate; vinyl esters such as vinyl acetate, vinyl pivalate; and vinyl neononanoate; acrylate and methacrylate esters of cycloalkyl; aromatic or bridged cycloalkyl alcohols such as benzyl methacrylate, isobornyl acrylate, isobornyl methacrylate, 4-t-butylcyclohexyl methacrylate, cyclohexyl methacrylate, phenyl acrylate, phenylmethacrylate, 2-naphthyl acrylate, and 2-naphthyl methacrylate and styrene and substituted styrene derivatives such as alpha-methyl styrene.

Other useful (meth)acrylic ester (co)polymers include vinyl-terminated polymeric monomers (so called "macromolecular monomers" or "macromers") described in U.S. Pat. No. 4,554,324 (Husman et al.) and U.S. Pat. No. 4,693,776 (Krampe et al.) and include polymeric moieties having a Tg of greater than 20° C. and weight average molecular weight (Mw) in the range of 2,000 grams/mole (g/mole) to 30,000 g/mole. Useful polymeric moieties include vinyl aromatic polymers such as polystyrene, poly (alpha-methylstyrene), poly(vinyl-toluene) and its isomers, or non-aromatic vinyl polymers such as poly(methylmethacrylate).

In some embodiments, the pressure sensitive adhesive layer includes hot melt coatable (meth)acrylic ester (co) polymers that include one or more copolymerized polar monomers. The polar monomers contribute to the mechanical properties of the hot melt (meth)acrylic ester (co)polymer. In addition, such polar monomers enhance internal reinforcement and surface affinity of the resultant (meth) acrylic ester (co)polymer composition. Useful acidic polar monomers include, but are not limited to, those selected from mono-ethylenically unsaturated carboxylic acids, sulfonic acids, phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, particularly preferred acidic polar monomers are the mono-ethylenically unsaturated carboxylic acids. When even stronger acids are desired, particularly preferred acidic polar monomers include the ethylenically unsaturated sulfonic acids and ethylenically unsaturated phosphonic acids. Other useful polar monomers include N-vinyl lactams such as N-vinyl pyrrolidone, N-vinyl caprolactam, substituted (meth)acrylamides such as N,N-dimethylacrylamide, N,N-dimethyl methacrylamide, N,N-diethylacrylamide, N,N-diethyl methacrylamide, N-tert-octylacrylamide and N-isopropylacrylamide; (meth) acrylonitrile, and maleic anhydride.

In certain embodiments, the (meth)acrylic ester (co)polymers are derived from monomers including at least 40% by weight (wt-%), at least 70 wt-%, or at least 85 wt-%, of at least one low Tg monomer as described herein that, as a homopolymer, has a Tg of less than 0° C., and preferably less than about −20° C. In certain embodiments, the (meth) acrylic ester (co)polymers are derived from monomers including up to 98 wt-%, or up to 90 wt-%, of at least one low Tg monomer as described herein that, as a homopolymer, has a Tg of less than 0° C., and preferably less than −20° C.

In certain embodiments, the (meth)acrylic ester (co)polymers are derived from monomers including at least 2 wt-% of at least one copolymerizable polar monomer. In certain embodiments, the (meth)acrylic ester (co)polymers are derived from monomers including up to 30 wt-%, or up to 15 wt-%, of at least one copolymerizable polar monomer.

In certain embodiments, the (meth)acrylic ester (co)polymers are derived from other vinyl monomers and high Tg (meth)acrylate monomers which, as homopolymers, have a Tg greater than 20° C., provided that the Tg of the resultant (meth)acrylic ester copolymer is less than 0° C.

In the practice of the present disclosure, the (meth)acrylic ester (co)polymers can be polymerized by techniques including, but not limited to, the conventional techniques of solvent polymerization, dispersion polymerization, emulsion polymerization, suspension polymerization, solventless bulk polymerization and radiation polymerization, including processes using ultraviolet light, electron beam and gamma radiation. The starting materials may include a polymerization initiator, especially a thermal initiator or a photoinitiator, of a type and in an amount effective to polymerize the monomers of the (meth)acrylic ester (co)polymer.

Solvent polymerization is well known in the art and described in various sources such as U.S. Pat. No. Re 24,906 (Ulrich) and U.S. Pat. No. 4,554,324 (Busman et al.). Briefly, the procedure is carried out by adding the monomers, a suitable solvent such as ethyl acetate, and an optional chain transfer agent to a reaction vessel, adding a free radical initiator, purging with nitrogen, and maintaining the reaction vessel at an elevated temperature, typically in the range of 40° C. to 100° C. until the reaction is completed, typically in 1 to 20 hours, depending upon the batch size and temperature. Suitable free radical initiators are commercially available such as those from DuPont Company under the VAZO trade name designation. Specific examples include VAZO 64 (2,2'-azobis(isobutyroniltrile) and VAZO 52. Suitable initiators also include hydroperoxides, such as tert-butyl hydroperoxide, and peroxides, such as benzoyl peroxide and cyclohexane peroxide.

Dispersion polymerization typically is carried out as single-phase reaction mixture consisting of a solution of monomers, initiator and steric stabilizer in a solvent that does not dissolve the resulting polymer. The initial stage of the polymerization is a typical solution polymerization and the polymer chains grow in size until they become insoluble in the reaction mixture. As the polymer starts to precipitate out of the mixture, the steric stabilizer adsorbs on the surface of the polymer preventing coalescence of the polymer particles as they form. The reaction will continue until all the monomer is consumed resulting in the formation of polymer particles insoluble in the reaction medium in which they were formed.

Emulsion polymerization is also described in U.S. Pat. No. Re 24,906 (Ulrich) in which the monomers are added to distilled water with an emulsifying agent and suitable initiators in a reaction vessel, purged with nitrogen, and heated with agitation, typically to a temperature in the range of 25° C. to 80° C., until the reaction is completed.

For ease of handling and/or to employ emulsion polymerized (meth)acrylic ester (co)polymers as solid materials or coatable, dispersible powders, the emulsion polymerized (meth)acrylic ester (co)polymer can be spray dried using conventional drying techniques. To prepare such powders, the emulsion polymerized base copolymer can be fed to a nozzle that sprays the emulsion into a stream of hot gas. The aqueous emulsion medium evaporates first, forming a small droplet of concentrated base copolymer. As aqueous medium removal nears completion, the droplet is transformed into a powder particle. See, for example, U.S. Pat. No. 3,772,262 (Clementi) or K. Masters, "Spray Drying," 2nd ed., Wiley: 1976.

The (meth)acrylic ester (co)polymer can also be prepared in bead form using suspension polymerization methods. Such suspension methods are described, for example, in European Patent Appl. No. 853092 (Bogaert et al.). This suspension process involves mixing the monomers (e.g., low Tg (meth)acrylate monomer(s), high Tg monomer(s), polar monomer(s)), free radical initiator, chain transfer agent, and other desired additives to form a premix. A suspension stabilizer, such as dextrin or a dextrin derivative, is combined with water and then with the premix to form an oil in water suspension. The resulting suspension typically includes from 10 to 50 wt-% premix and from 90 to 50 wt-% water phase. Polymerization is then initiated, typically thermally, and carried out for 2 to 16 hours at a temperature from 40° C. to 90° C. The (meth)acrylic ester (co)polymer beads can be isolated by a variety of means and generally have a diameter of 1 micron to 5000 microns Similar to the emulsion process, smaller particles can be spray-dried to recover the (meth)acrylic ester (co)polymer. Larger particles can be isolated, for example, by simple filtration and air-dried.

Solventless polymerization methods, such as the continuous free radical polymerization method described in U.S. Pat. Nos. 4,619,979 and 4,843,134 (both Kotnour et al.), the essentially adiabatic polymerization methods using a batch reactor described in U.S. Pat. No. 5,637,646 (Ellis), and the methods described for polymerizing packaged pre-adhesive compositions described in U.S. Pat. No. 5,804,610 (Hamer et al.) may also be utilized to prepare the (meth)acrylic ester (co)polymers.

In one preferred embodiment of this latter method, from 0.1 gram to 500 grams of the polymerizable mixture including monomers (e.g., low Tg (meth)acrylate monomer(s), high Tg monomer(s), polar monomer(s)), initiator, and optional chain transfer agent is completely surrounded by a packaging material. In another preferred embodiment, the pre-adhesive composition is disposed on the surface of a sheet, or between a pair of two substantially parallel sheets.

The packaging material is made of a material that when combined with the (meth)acrylic ester (co)polymer or plasticized PSA composition does not substantially adversely affect the desired PSA characteristics. A hot melt coated PSA produced from a mixture of the pressure sensitive adhesive and the packaging material may have improved PSA properties compared to hot melt coated PSA produced from the PSA alone.

The packaging material should be appropriate for the polymerization method used. For example, with photopolymerization, it is necessary to use a film material that is sufficiently transparent to ultraviolet radiation at the wavelengths necessary to effect polymerization. Polymerization can be effected by exposure to ultraviolet (UV) radiation as described in U.S. Pat. No. 4,181,752 (Martens et al.). In a preferred embodiment, the polymerization is carried out with UV black lights having over 60 percent, and preferably over 75 percent of their emission spectra from 280 nm to 400 nm, with intensity from 0.1 mW/cm$^2$ to 25 mW/cm$^2$.

In another preferred solventless polymerization method, the (meth)acrylic ester (co)polymers of the present disclosure are prepared by photoinitiated polymerization methods according to the technique described in U.S. Pat. No. 4,181,752 (Martens et al.). The monomers (e.g., low Tg (meth)acrylate monomer(s), high Tg monomer(s), polar monomer(s)) and photoinitiator are mixed together in the absence of solvent and partially polymerized to a viscosity in the range of from 500 Centipoise (cps) to 50,000 cps to achieve a coatable syrup. Alternatively, the monomers and photoinitiator are mixed in the absence of solvent and partially polymerized to make syrup. In yet another way, the monomers, and plasticizing agent may be mixed with a thixotropic agent such as fumed hydrophilic silica to achieve a coatable thickness. A UV cross-linking agent and any other ingredients are then added to the pre-polymerized syrup or thickened plasticized monomer mixture. Alternatively, these ingredients (with the exception of the cross-linking agent) can be added directly to the monomer mixture prior to pre-polymerization.

The resulting composition is coated onto a substrate (which may be transparent to UV radiation) and polymerized in an inert (i.e., oxygen free) atmosphere (e.g., a nitrogen atmosphere) by exposure to UV radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to UV radiation and irradiating through that film in air as described in the aforementioned patent using UV lamps. Alternatively, instead of covering the polymerizable coating, an oxidizable tin compound may be added to the polymerizable syrup to increase the tolerance of the syrup to oxygen as described in U.S. Pat. No. 4,303,485 (Levens). The ultraviolet light source preferably has about 90% of the emissions from 280 nm to 400 nm (more preferably from 300 nm to 400 nm), with a maximum at 351 nm.

A free radical initiator is preferably added to aid in the copolymerization of the monomers (e.g., low Tg (meth) acrylate monomer(s), high Tg monomer(s), and polar monomer(s)). The type of initiator used depends on the polymerization process. Photoinitiators that are useful for polymerizing the polymerizable mixture monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,1-propanedione-2-(o-ethoxycarbonyl) oxime. An example of a commercially available photoinitiator is IRGACURE 651 (2,2-dimethoxy-1,2-diphenyle-thane-1-one, from BASF Corp.). Generally, the photoinitiator is present in an amount of 0.005 wt-% to 1 wt-%, based on the weight of the copolymerizable monomers. Examples of suitable thermal initiators include AIBN (2,2'-azobis(isobutyronitrile), hydroperoxides, such as tert-butyl hydroperoxide, and peroxides, such as benzoyl peroxide and cyclohexane peroxide.

In certain embodiments, the (meth)acrylic ester (co)polymers are polymerized without solvent. Yet, suitable inert organic solvents, if desired, may be any organic liquid that is sufficiently inert to the reactants and product such that it will not otherwise adversely affect the reaction. Such solvents include ethyl acetate, acetone, methyl ethyl ketones, and mixtures thereof. If used, the amount of solvent is generally 30 wt-% to 80 wt-%, based on the total weight of the reactants (monomers and initiator) and solvent. In such cases, the solvent is generally removed from the polymers prior to coating.

Optionally, the composition also includes a chain transfer agent to control the molecular weight of the (meth)acrylic ester (co)polymer. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, pentaerythritol mercaptopropionate, 2-mercaptoimidazole and 2-mercaptoethyl ether.

The amount of chain transfer agent that is useful depends upon the desired molecular weight and the type of chain transfer agent. The chain transfer agent is typically used in amounts from 0.001 part by weight to 10 parts by weight per 100 parts of the base copolymer, and preferably from 0.01 part by weight to 0.5 part by weight, and more preferably from 0.02 part by weight to 0.20 part by weight.

Commercially available meth(acrylic) ester (co)polymer PSAs have low Mw (less than about 200,000 g/mole) and low melt viscosity (less than about 40 Pa-s at a temperature of 130° C. and 100 sec$^{-1}$ shear rate in a cone and plate rheological measurement) to be considered hot melt coatable by roll coating or slot die methods at temperatures less than 160° C. and high production coating speeds. Temperatures greater than about 160° C. promote thermal degradation of the PSA. Examples of such commercially available (meth) acrylic ester PSAs include the acRESIN series (A204UV, A250UV, A260UV, and DS3532 from BASF Corp.) and the NOVARAD RC series (from Novamelt Gmbh). These acrylic ester copolymers require UV curing after coating to develop useful PSA performance due to their low molecular weights. The UV cross-linking is brought about via high intensity UV exposure combined with UV responsive chemical cross-linker grafted in the copolymer structure.

The contact coating process of the present disclosure allows for the ability to coat much higher molecular weight (up to 1,000,000 g/mole or more) (meth)acrylic ester (co) polymers at low coating weights (down to 4 g/m$^2$) and high speeds (e.g., greater than 1000 feet/minute). The ability to coat higher molecular weight acrylics opens up the formulation window to include coatings having higher adhesive performance at lower UV or electron beam doses and may eliminate the need of a post radiation cure for some product applications. Higher molecular weight strongly influences PSA performance in many applications requiring clean removal and shear resistance (e.g., packaging tapes for corrugated fiberboard bonding).

In some embodiments, the pressure sensitive adhesive layer includes tackifiers, oils, and/or plasticizers, whereas in some embodiments, the pressure sensitive adhesive layer is substantially free of tackifiers, oils, and plasticizers.

The (meth)acrylic ester (co)polymers may be self-tacky or tackified. Useful (meth)acrylic ester (co)polymer PSAs generally contain 0 part to 100 parts of one or more compatible tackifying resins to 100 parts of the (meth)acrylic ester (co)polymer. Suitable tackifying resins used with (meth) acrylic ester (co)polymers generally include, but are not limited to, aliphatic olefin-derived resins such as the ESCOREZ 1000 series (from ExxonMobil Chemical Co.); gum rosin esters such as the FORAL series and the STAY-BELITE-E series (both from Pinova, Inc.); tall oil rosin esters such as the SYLVATAC and SYLVALITE series (from Arizona Chemical), the WESTREZ 5000 series (from MeadWestvaco Corp.) and the PERMALYN series (from Eastman Chemical Co.); polyterpenes such as the PICCO-LYTE A, F, C, and S series (from Pinova, Inc.); cycloaliphatic hydrocarbons, such as the ESCOREZ 5000 series (from ExxonMobil Chemical Co.) and terpene phenolic resins derived from petroleum or turpentine sources such as SYLVARES TP 2019 (from Arizona Chemical).

Plasticizing agents (i.e., plasticiers) selected for use in the (meth)acrylic ester (co)polymers of the present disclosure possess a range of properties. Generally, the plasticizing agents can be liquid or solid, have a range of molecular weights and architectures, are compatible with the (meth) acrylic ester (co)polymers, are monomeric or polymeric and are non-volatile and non-reactive. Additionally, mixtures of solid and liquid, monomeric and polymeric and other combinations of plasticizing agents can be used in the present disclosure.

Generally, liquid plasticizing agents are readily compoundable with the (meth)acrylic ester (co)polymers and/or can be chosen to be miscible with the monomers for plasticized PSA compositions prepared using bulk polymerization methods. In addition, liquid plasticizing agents may be delivered directly to non-tacky (meth)acrylic ester (co) polymers or onto already coated base copolymer films and are typically absorbed quickly to activate the pressure-sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a mono-functional alcohol or mono-functional acid. Examples of these are esters of mono- and multibasic acids, such as isopropyl myristate, dibutyl phthalate, diisoctyl phthalate, dibutyl adipate, dibutylsebacate, and the like. Useful polymeric plasticizing agents are non-acrylic and are typically derived from cationically or free-radically polymerizable, condensation polymerizable or ring-opening polymerizable monomers to make low molecular weight polymers. Examples of these polymeric plasticizing agents include materials such as polyurethanes, polyureas, polyvinylethers, polyethers, polyesters, and the like. As used in this application "non-acrylic" means the polymeric plasticizing agent contains less than 20% by weight of any (meth)acrylic monomers.

Useful plasticizing agents are compatible with the (meth) acrylic ester (co)polymer, such that once the plasticizing agent is mixed with the (co)polymer, the plasticizing agent does not phase separate from the (co)polymer. By "phase separation" or "phase separate," it is meant that by differential scanning calorimetry (DSC) no detectable thermal transition, such as a melting or glass transition temperature can be found for the pure plasticizing agent in the plasticized (meth)acrylic ester (co)polymer. Some migration of the plasticizing agent from or throughout the plasticized (meth) acrylic ester (co)polymer can be tolerated, such as minor separation due to composition equilibrium or temperature influences, but the plasticizing agent does not migrate to the extent of phase separation between the (meth)acrylic ester (co)polymer and the plasticizing agent. When polymeric plasticizing agents are used, they tend to be a bit more limited in their applications than monomeric plasticizing agents and, in general, the lower the molecular weight of the polymeric plasticizing agent, the higher their compatibility with the (meth)acrylic ester (co)polymer. Plasticizing agent compatibility with the (meth)acrylic ester (co)polymer can also be dependent upon the chemical nature of the plasticizing agent and the monomeric content of the (meth)acrylic ester (co)polymer. For example, polymeric plasticizing agents based on polyether backbones (such as polyethylene glycols) are observed to be more compatible than polyester plasticizing agents, especially when higher levels of acidic polar monomer are used.

Plasticizing agents used in the present disclosure are preferably non-volatile. If the plasticizing agent is to be used in bulk polymerization processes where the (meth)acrylic ester (co)polymer is formed in the presence of the plasticizing agent, then the plasticizing agent not only solvates the monomers, but also remains present and stable under polymerization reaction conditions to serve as a polymerization medium for the monomers (e.g., low Tg (meth)acrylate monomer(s), high Tg monomer(s), and polar monomer(s)). The presence of the plasticizing agent in plasticized (meth) acrylic ester (co)polymers having PSA properties operates to maintain adhesion properties of the PSA compositions.

Additionally, useful plasticizing agents are non-reactive, thus preventing copolymerization with the monomers of the (meth)acrylic ester (co)polymer. Thus, plasticizing agents having acrylate functionality, methacrylate functionality, styrene functionality, or other ethylenically unsaturated, free radically reactive functional groups are generally not used.

Particularly useful plasticizing agents include polyalkylene oxides having weight average molecular weights of 150 g/mole to 5,000 g/mole, preferably of 150 g/mole to 1,500 g/mole, such as polyethylene oxides, polypropylene oxides, polyethylene glycols; alkyl or aryl functionalized polyalkylene oxides, such as PYCAL 94 (a phenyl ether of polyethylene oxide from Croda International Plc.); benzoyl functionalized polyethers, such as the BENZOFLEX series (from Eastman Chemical Co.); monomethyl ethers of polyethylene oxides; monomeric adipates, such as dioctyl adipate, diisononyl adipate, dibutoxyethoxyethyl adipate and dibutoxypropoxypropyl adipate; polymeric adipates, such as polyester adipates; citrates, such as acetyltri-n-butyl citrate; phthalates, such as butyl benzylphthalates; trimellitates; sebacates; polyesters, such as the PARAPLEX G series (from HallStar Co.); phosphate esters, such as the SANTI-CIZER series (from Ferro Corp); glutarates such as PLAST-HALL 7050 (a dialkyl diether glutarate from the HallStar Co.), and mixtures thereof.

A plasticizing agent is typically used in amounts of from 1 part by weight to 100 parts by weight per 100 parts (pph) of the (meth)acrylic ester (co)polymer. Preferably, the plasticizing agent is present in amounts from 3 pph to 50 pph. Most preferably, the plasticizing agent is present in amounts from 3 pph to 40 pph.

The amount of plasticizing agent used depends upon the type and ratios of the monomers (e.g., low Tg (meth)acrylate monomer(s), high Tg monomer(s), and polar monomer(s)) employed in the (meth)acrylic ester (co)polymer and the chemical class and molecular weight of the plasticizing agent used in the composition. For example, as the modulus of the (meth)acrylic ester (co)polymer increases, higher levels of plasticizing agent are necessary to bring the compounded material modulus down into the useful range for PSA making (i e, the shear storage modulus is below the Dahlquist Criterion). As the amount of plasticizing agent in the PSA is increased, maintaining cohesive strength becomes increasingly difficult, thus creating a practical upper limit on the amount of plasticizing agent that can be tolerated in the final PSA. High levels of plasticizing agent may be beneficial if properties such as aggressive tack, low temperature performance or smooth peel are required. Typically, as the molecular weight of the (meth)acrylic ester (co)polymer drops, the maximum plasticizing agent loading that can be used and still obtain good cohesive strength also drops. Very similarly, if high-temperature shear holding is desired, lower plasticizing agent levels are recommended.

Considering practical constraints for PSA formulation, it should be clear that there is also an upper limit for the shear modulus of the (meth)acrylic ester (co)polymer to begin with and still enable PSA behavior with plasticizing agent loadings of 100 pph or less. Actual modulus values are difficult to define as it strongly depends on the type of plasticizing agent, plasticizing efficiency and the compatibility of the plasticizing agent with the (meth)acrylic ester (co)polymer.

The (meth)acrylic ester (co)polymers of the present disclosure can also include a cross-linking agent to improve the internal strength, solvent resistance and other properties. The cross-linking agent is present in an amount of from 0.05 wt-% to 5 wt-%, based on 100 parts of the (meth)acrylic ester (co)polymer or based upon 100 parts by weight of the monomers (e.g., low Tg (meth)acrylate monomer(s), high Tg monomer(s) and polar monomer(s)) employed.

Cross-linking agents useful in solution, emulsion, suspension, and solventless polymerized hot melt (meth)acrylic ester (co)polymer compositions are those which are free radically copolymerizable and/or which effect cross-linking through exposure to radiation, moisture or heat following coating of the (meth)acrylic ester (co)polymer. Typically, to maintain hot melt processability and coatability of the (meth)acrylic ester (co)polymer, cross-linking occurs following the compounding of the (meth)acrylic ester (co) polymer with the tackifiers, plasticizers, cross-linkers, and other additives and coating of the mixture. One type of chemical cross-linker is a photosensitive cross-linker that is activated by exposure to high intensity UV light. Examples of such cross-linkers are described in U.S. Pat. No. 4,737, 559 (Kellen et al.) and include hydrogen abstracting benzophenones and mono-ethylenically unsaturated aromatic ketones, particularly 4-acryloxybenzophenone (4ABP). Another class of photosensitive cross-linkers includes the substituted triazines, such as those disclosed in U.S. Pat. No. 4,329,384 (Vesley et al.) and U.S. Pat. No. 4,330,590 (Vesley), e.g., 2,4-bis(trichloromethyl)-6-p-methoxysty-rene-S-triazine and the chromophore halomethyl-S-triazines. The substituted triazines are activated by UV light generated from artificial sources such as medium pressure mercury lamps or a UV blacklight. Another class of chemical cross-linkers includes multi-functional acrylates disclosed in U.S. Pat. No. 4,379,201 (Heilmann et al.), such as 1,6-hexanediol diacrylate (HDDA), trimethylolpropane triacrylate (TMPTA), pentaerytlritol tetraacrylate (PETA), 1,2-ethylene glycol diacrylate (EGDA), and 1,12-dodecanediol diacrylate. The multi-functional acrylates are activated by exposure to UV light when combined with UV absorbing photoinitiators such as IRGACURE 651 (2,2-dimethoxy-1, 2-diphenylethane-1-one, from BASF Corp.) and visible light absorbing photo-initiators such as IRGACURE 819 [bis(2, 4,6-trimethylbenzoyl)-phenylphosphineoxide from BASF Corp.]. The multi-functional acrylates can be activated without the presence of a photo-initiator upon exposure to high-energy electromagnetic radiation such as gamma or electron beam radiation. Some of the (meth)acrylic ester (co)polymers will cross-link without the addition of chemical photo cross-linkers upon exposure to gamma or electron beam radiation.

Ionic cross-linking methods can also be used. Examples of these include the simple addition of multifunctional metal ions, such as for example, zirconium acetate (from Magnesium Elektron Ltd., Flemington, NJ); or the compounding with polymeric basic cross-linkers as disclosed in U.S. Pat. No. 6,720,387 (Stark et al.).

Exemplary Embodiments

Exemplary Embodiment 1 is an adhesive article comprising: a coextruded polymeric backing comprising: a first layer comprising an amorphous polyamide, the first layer having first and second opposing major surfaces; and a second layer comprising a polar-modified polyolefin, the second layer having first and second opposing major surfaces; wherein the first major surface of the second layer is in contact with the second major surface of the first layer; and an acrylic pressure sensitive adhesive layer in contact with the first major surface of the first layer of the backing.

Exemplary Embodiment 2 is the adhesive article of Exemplary Embodiment 1, wherein the amorphous polyamide has an enthalpy of fusion from the second heat ramp of a heat-cool-heat cycle of no greater than 40 J/g as measured by differential scanning calorimetry (DSC).

Exemplary Embodiment 3 is the adhesive article of Exemplary Embodiment 1 or 2, wherein the amorphous polyamide has an enthalpy of fusion from the second heat ramp of a heat-cool-heat cycle of at least 0 J/g as measured by differential scanning calorimetry (DSC).

Exemplary Embodiment 4 is the adhesive article of any preceding Exemplary Embodiment, wherein the amorphous polyamide has an enthalpy of fusion from the second heat ramp of a heat-cool-heat cycle of at least 30 J/g as measured by differential scanning calorimetry (DSC).

Exemplary Embodiment 5 is the adhesive article of any preceding Exemplary Embodiment, wherein the amorphous polyamide has a glass-transition temperature (Tg) of up to 135° C. (in some embodiments, up to 100° C. or up to 80° C.) as measured on a dry sample by differential scanning calorimetry, according to ISO 11357, with a heating gradient of 10° C./min.

Exemplary Embodiment 6 is the adhesive article of any preceding Exemplary Embodiment, wherein the amorphous polyamide is characterized by a Tg of at least −20° C. as measured on a dry sample by differential scanning calorimetry, according to ISO 11357, with a heating gradient of 10° C./min.

Exemplary Embodiment 7 is the adhesive article of any preceding Exemplary Embodiment, wherein the amorphous polyamide is at least one amorphous dimer acid-based polyamide or at least one amine-terminated polyamide.

Exemplary Embodiment 8 is the adhesive article of any preceding Exemplary Embodiment, wherein the amorphous polyamide comprises an amorphous epoxide chain extended polyamide.

Exemplary Embodiment 9 is the adhesive article of Exemplary Embodiment 8, wherein the amorphous epoxide chain extended polyamide comprises up to 2.5 (in some embodiments, up to 2, or even up to 1.5) percent by weight epoxy, based on the total weight of the amorphous epoxide chain extended polyamide.

Exemplary Embodiment 10 is the adhesive article of Exemplary Embodiment 8 or 9, wherein the amorphous epoxide chain extended polyamide comprises at least 0.1 (in some embodiments, at least 0.2, at least 0.25, at least 0.5, at least 0.7, at least 1, or even greater than 1) percent by weight epoxy, based on the total weight of the amorphous epoxide chain extended polyamide.

Exemplary Embodiment 11 is the adhesive article of any of Exemplary Embodiments 8 through 10, wherein the amorphous epoxide chain extended polyamide comprises 0.1 to 2.5 (in some embodiments, 0.2 to 2.5, 0.25 to 2.5, 0.5 to 2.5, 0.5 to 2, 0.5 to 1.5, 0.7 to 1.5, 1 to 2.5, or greater than 1 and up to 2.5) percent by weight epoxy, based on the total weight of the amorphous epoxide chain extended polyamide.

Exemplary Embodiment 12 is the adhesive article of any preceding Exemplary Embodiment, wherein the amorphous polyamide is present in an amount of at least 50 (in some embodiments, in an amount of at least 60, at least 70, at least 80, or at least 90) weight percent, based on the total weight of the first layer.

Exemplary Embodiment 13 is the adhesive article of any preceding Exemplary Embodiment, wherein the amorphous polyamide is present in an amount of up to 100 (in some embodiments, in an amount of up to 95) weight percent, based on the total weight of the first layer.

Exemplary Embodiment 14 is the adhesive article of Exemplary Embodiment 12 or 13, wherein the amorphous polyamide is present in an amount in a range of 50 to 100 (in some embodiments, in an amount of 60 to 100, 70 to 100, 80 to 100, or even 90 to 100) weight percent, based on the total weight of the first layer.

Exemplary Embodiment 15 is the adhesive article of any preceding Exemplary Embodiment, wherein the polar-modified polyolefin comprises a copolymer of an olefin and one or more polar comonomers.

Exemplary Embodiment 16 is the adhesive article of Exemplary Embodiment 15, wherein the olefin comprises ethylene, propylene, or a mixture thereof.

Exemplary Embodiment 17 is the adhesive article of Exemplary Embodiment 15 or 16, wherein the olefin to polar comonomer weight ratio is in a range of 97:3 to 70:30 (in some embodiments, in a range of 96:4 to 75:25, 96:4 to 80:20, 95:5 to 75:25, 95:5 to 80:20, or even 95:5 to 85:15).

Exemplary Embodiment 18 is the adhesive article of any of Exemplary Embodiments 15 through 17, wherein the one or more polar comonomers comprise at least one monomer selected from the group of vinyl acetate, methyl acetate, acrylic acid, methacrylic acid, methyl acrylate, ethyl acrylate, butyl acrylate, glycidyl methacrylate, carbon monoxide, and a mixture thereof.

Exemplary Embodiment 19 is the adhesive article of any preceding Exemplary Embodiment, wherein the polar-modified polyolefin comprises a grafted polyolefin comprising polyolefin and one or more grafted polar groups.

Exemplary Embodiment 20 is the adhesive article of Exemplary Embodiment 19, wherein the grafted polar groups are present in an amount of at least 0.1 wt-% (in some embodiments, at least 0.5 wt-% or at least 1 wt-%), based on the total weight of the grafted polyolefin.

Exemplary Embodiment 21 is the adhesive article of Exemplary Embodiment 19 or 20, wherein the grafted polar groups are present in an amount of up to 8 wt-% (in some embodiments, up to 5 wt-% or up to 2 wt-%), based on the total weight of the grafted polyolefin.

Exemplary Embodiment 22 is the adhesive article of any of Exemplary Embodiments 19 through 21, wherein the polyolefin is selected from the group of polyethylene, polypropylene, and a combination thereof.

Exemplary Embodiment 23 is the adhesive article of any of Exemplary Embodiments 19 through 22, wherein the grafted polar groups comprise maleic anhydride groups.

Exemplary Embodiment 24 is the adhesive article of any preceding Exemplary Embodiment, wherein the polar-modified polyolefin is present in an amount of at least 60 (in some embodiments, in an amount of at least 70, at least 80, or at least 90) weight percent, based on the total weight of the second layer.

Exemplary Embodiment 25 is the adhesive article of any preceding Exemplary Embodiment, wherein the polar-modified polyolefin is present in an amount of up to 100 (in some embodiments, in an amount of up to 95) weight percent, based on the total weight of the second layer.

Exemplary Embodiment 26 is the adhesive article of Exemplary Embodiment 24 or 25, wherein the polar-modified polyolefin is present in an amount in a range of 60 to 100 (in some embodiments, in an amount of 70 to 100, 80 to 100, or even 90 to 100) weight percent, based on the total weight of the second layer.

Exemplary Embodiment 27 is the adhesive article of any preceding Exemplary Embodiment, wherein the polar-modified polyolefin comprises an olefin, one or more polar comonomers, and one or more grafted polar groups.

Exemplary Embodiment 28 is the adhesive article of any preceding Exemplary Embodiment, wherein the second layer comprises a mixture of at least two different polar-modified polyolefins.

Exemplary Embodiment 29 is the adhesive article of Exemplary Embodiment 28, wherein the at least two different polar-modified polyolefins each independently comprises different polar comonomers, different grafted polar groups, or both.

Exemplary Embodiment 30 is the adhesive article of Exemplary Embodiment 28, wherein the at least two different polar-modified polyolefins each independently comprises the same polar comonomers and/or grafted polar groups but with different levels.

Exemplary Embodiment 31 is the adhesive article of any preceding Exemplary Embodiment, wherein the coextruded polymeric backing has an average thickness of at least 10 (in some embodiments, at least 15, at least 20, at least 25, at least 30, at least 35, at least 40, at least 45, at least 50, at least 55, at least 60, at least 65, at least 70, at least 75, or at least 100) micrometers.

Exemplary Embodiment 32 is the adhesive article of any preceding Exemplary Embodiment, wherein the coextruded polymeric backing has an average thickness of up to 500 (in some embodiments, up to 450, up to 400, up to 350, up to 300, up to 250, up to 200, or up to 150) micrometers.

Exemplary Embodiment 33 is the adhesive article of Exemplary Embodiment 31 or 32, the coextruded polymeric backings described herein have an average thickness in a range of 10 to 500 (in some embodiments, 20 to 500, 30 to 500, 30 to 400, or even 30 to 250) micrometers.

Exemplary Embodiment 34 is the adhesive article of any preceding Exemplary Embodiment, wherein the first layer has an average thickness of at least 1 (in some embodiments, at least 2, at least 3, at least 4, at least 5, at least 10, or even at least 25) micrometer.

Exemplary Embodiment 35 is the adhesive article of any preceding Exemplary Embodiment, wherein the first layer has an average thickness of up to 70 (in some embodiments, up to 60 or up to 50) micrometers.

Exemplary Embodiment 36 is the adhesive article of Exemplary Embodiment 34 or 35, wherein the first layer has an average thickness in a range of 1 to 70 (in some embodiments, in a range of 2 to 70, 3 to 70, 3 to 60, or even 3 to 50) micrometers.

Exemplary Embodiment 37 is the adhesive article of any preceding Exemplary Embodiment, wherein the second layer has an average thickness of at least 1 (in some embodiments, at least 2, at least 3, at least 4, at least 5, at least 10, or even at least 25) micrometer.

Exemplary Embodiment 38 is the adhesive article of any preceding Exemplary Embodiment, wherein the second layer has an average thickness of up to 70 (in some embodiments, up to 60 or up to 50) micrometers.

Exemplary Embodiment 39 is the adhesive article of Exemplary Embodiment 37 or 38, wherein the second layer has an average thickness in a range of 1 to 70 (in some embodiments, in a range of 2 to 70, 3 to 70, 3 to 60, or even 3 to 50) micrometers.

Exemplary Embodiment 40 is the adhesive article of any preceding Exemplary Embodiment, wherein the coextruded polymeric backing further includes a third layer disposed on the second layer, the third layer having first and second opposing major surfaces, wherein the first major surface of the third layer contacts the second major surface of the second layer.

Exemplary Embodiment 41 is the adhesive article of any preceding Exemplary Embodiment, wherein the coextruded polymeric backing further includes a fourth layer disposed on the third layer, the fourth layer having first and second opposing major surfaces, wherein the first major surface of the fourth layer contacts the second major surface of the third layer.

Exemplary Embodiment 42 is the adhesive article of Exemplary Embodiment 41, wherein the coextruded polymeric backing further includes a fifth layer disposed on the fourth layer, the fifth layer having first and second opposing major surfaces, wherein the first major surface of the fifth layer contacts the second major surface of the fourth layer.

Exemplary Embodiment 43 is the adhesive article of Exemplary Embodiment 42, wherein the coextruded polymeric backing further includes a sixth layer disposed on the fifth layer, the sixth layer having first and second opposing major surfaces, wherein the first major surface of the sixth layer contacts the second major surface of the fifth layer.

Exemplary Embodiment 44 is the adhesive article of Exemplary Embodiment 43, wherein the coextruded polymeric backing further includes a seventh layer disposed on the sixth layer, the seventh layer having first and second opposing major surfaces, wherein the first major surface of the seventh layer contacts the second major surface of the sixth layer.

Exemplary Embodiment 45 is the adhesive article of Exemplary Embodiment 44, wherein the coextruded polymeric backing further includes a eighth layer disposed on the seventh layer, the eighth layer having first and second opposing major surfaces, wherein the first major surface of the eighth layer contacts the second major surface of the seventh layer.

Exemplary Embodiment 46 is the adhesive article of Exemplary Embodiment 45, wherein the coextruded polymeric backing further includes a ninth layer disposed on the eighth layer, the ninth layer having first and second opposing major surfaces, wherein the first major surface of the ninth layer contacts the second major surface of the eighth layer.

Exemplary Embodiment 47 is the adhesive article of any of Exemplary Embodiments 40 through 46, wherein each of the third, fourth, fifth, sixth, seventh, eighth, or ninth layer (s), to the extent present, independently has an average thickness of at least 1 (in some embodiments, at least 2, at least 3, at least 4, at least 5, at least 10, or even at least 25) micrometer.

Exemplary Embodiment 48 is the adhesive article of any of Exemplary Embodiments 40 through 47, wherein each of the third, fourth, fifth, sixth, seventh, eighth, or ninth layer (s), to the extent present, independently has an average thickness of up to 70 (in some embodiments, up to 60 or up to 50) micrometers.

Exemplary Embodiment 49 is the adhesive article of any of Exemplary Embodiments 40 through 48, wherein each of the third, fourth, fifth, sixth, seventh, eighth, or ninth layer (s), to the extent present, independently has an average thickness in a range of 1 to 70 (in some embodiments, in a range of 2 to 70, 3 to 70, 3 to 60, or even 3 to 50) micrometers.

Exemplary Embodiment 50 is the adhesive article of any of Exemplary Embodiments 40 through 49, wherein each of the third, fourth, fifth, sixth, seventh, eighth, or ninth layer (s), to the extent present, independently comprises at least one of the following polymers: acrylic (e.g., poly(methyl) methacrylate (PMMA)), melamine, polyolefin, polycarbonate, polyvinyl butyral, polyester (e.g., polyethylene terephthalate), polyvinyl (e.g., vinyl, polymeric materialized vinyl, reinforced vinyl, vinyl/acrylic blends), polyvinyl halide (e.g., poly(vinyl chloride) and poly(vinyl fluoride)), urethane, a copolymer thereof (e.g., polyethylene copolymers, e.g., ethyl vinyl acetate (EVA), ethyl methyl acetate (EMA), and ethylene-co-acrylic acid (EAA)), maleic anhydride grafted polyolefin (e.g., maleic anhydride grafted ethylene polymer and or maleic anhydride grafted propylene).

Exemplary Embodiment 51 is the adhesive article of Exemplary Embodiment 50, wherein each of the third, fourth, fifth, sixth, seventh, eighth, or ninth layer(s), to the extent present, independently comprises one or more of such polymers in an amount of at least 60 (in some embodiments, in an amount of at least 70, at least 80, or at least 90) weight percent, based on the total weight of the respective layer.

Exemplary Embodiment 52 is the adhesive article of Exemplary Embodiment 50 or 51, wherein each of the third, fourth, fifth, sixth, seventh, eighth, or ninth layer(s), to the extent present, independently comprises one or more of such polymers in an amount of up to 100 (in some embodiments, in an amount of up to 95) weight percent, based on the total weight of the respective layer.

Exemplary Embodiment 53 is the adhesive article of Exemplary Embodiment 50 or 51, wherein each of the third, fourth, fifth, sixth, seventh, eighth, or ninth layer(s), to the extent present, independently comprises one or more of such polymers in an amount in a range of 60 to 100 (in some embodiments, in an amount of 70 to 100, 80 to 100, or even 90 to 100) weight percent, based on the total weight of the respective layer.

Exemplary Embodiment 54 is the adhesive article of any preceding Exemplary Embodiment, wherein at least one layer further comprises at least one of an antioxidant, an antiblock agent, an ultraviolet absorber (UVA), a hindered amine light stabilizer, a surfactant, an antistatic agent, a release agent, a slip additive, an ink or paint receptive material, an abrasion resistant material, a pigment, a dye, or metallic particles.

Exemplary Embodiment 55 is the adhesive article of any preceding Exemplary Embodiment, wherein the acrylic pressure sensitive adhesive layer comprises one or more acrylic polymers having a homopolymer or copolymer glass transition temperature (Tg) of less than 0° C.

Exemplary Embodiment 56 is the adhesive article of any preceding Exemplary Embodiment, wherein the acrylic pressure sensitive adhesive layer has a coating weight of less than 25 grams per square meter (g/m$^2$) (in certain embodiments, less than 21 g/m$^2$, less than 17 g/m$^2$, less than 13 g/m$^2$, or even less than 9 g/m$^2$).

Exemplary Embodiment 57 is the adhesive article of any preceding Exemplary Embodiment, wherein the acrylic pressure sensitive adhesive layer comprises one or more hot melt coatable (meth)acrylic ester (co)polymers.

Exemplary Embodiment 58 is the adhesive article of any preceding Exemplary Embodiment, wherein the hot melt coatable (meth)acrylic ester (co)polymer comprises one or more low Tg (meth)acrylate monomers.

Exemplary Embodiment 59 is the adhesive article of Exemplary Embodiment 58, wherein the hot melt coatable (meth)acrylic ester (co)polymer comprises one or more high Tg monomers copolymerized with the low Tg monomers.

Exemplary Embodiment 60 is the adhesive article of Exemplary Embodiments 58 or 59, wherein the hot melt coatable (meth)acrylic ester (co)polymer comprises one or more copolymerized polar monomers.

Exemplary Embodiment 61 is the adhesive article of any of Exemplary Embodiments 57 through 60, wherein the hot melt coatable (meth)acrylic ester (co)polymer is derived from monomers comprising 40 wt-% to 98 wt-% of at least one low Tg monomer having a homopolymer Tg of less than 0° C.

Exemplary Embodiment 62 is the adhesive article of any of Exemplary Embodiments 57 through 61, wherein the hot melt coatable (meth)acrylic ester (co)polymer is derived from monomers comprising 2 wt-% to 30 wt-% of at least one copolymerizable polar monomer.

Exemplary Embodiment 63 is the adhesive article of any of Exemplary Embodiments 57 through 62, wherein the acrylic pressure sensitive adhesive layer comprises a plasticizing agent.

Exemplary Embodiment 64 is the adhesive article of any of Exemplary Embodiments 57 through 63, wherein the acrylic pressure sensitive adhesive layer comprises a crosslinking agent.

Exemplary Embodiment 65 is the adhesive article of any of Exemplary Embodiments 57 through 64, wherein the acrylic pressure sensitive adhesive layer comprises a tackifier.

28

EXAMPLES

Advantages and embodiments of this present disclosure are further illustrated by the following examples, but the particular materials and amounts thereof recited in these examples, as well as other conditions and details, should not be construed to unduly limit this present disclosure. All parts and percentages are by weight unless otherwise indicated. Preparations of Adhesive Primers (Amorphous Polyamide Materials for First Layer)

Several adhesive primers were prepared by reactive extrusion as follows. An amine terminated polyamide resin prepared according to Example I of U.S. Pat. No. 3,377,303 (Peerman, et al.), was fed to a twin-screw extruder running at 163° C. and 300 revolutions per minute (rpm). A bisphenol-A based diglycidyl epoxy resin chain extender (obtained under the trade designation EPON RESIN 828 from Hexion Incorporated, Columbus, OH) was added to the melted amine terminated polyamide resin via a charge port on the extruder in the amount listed in Table 1, below. The resulting melt was then fed to an underwater pelletizer.

TABLE 1

| Adhesive Primer | Wt-% of Epoxy Chain Extender |
|---|---|
| Primer 1 | 0 |
| Primer 2 | 1.24% |
| Primer 3 | 0.92% |
| Primer 4 | 1.18% |
| Primer 5 | 1.31% |

An additional adhesive primer which has been designated as Primer 6 was obtained from Kraton Corporation (Houston, TX) under the trade designation UNI-REZ 2291 POLYAMIDE RESIN.

Examples 1-7 and Comparative Examples C1-C3

Three-layer films were produced on a three-layer multi-layer film blowing line (obtained under the trade designation ULTRAMICRO FILM BLOWING LINE LUMF-150 COEX from Labtech Engineering Co., Ltd., Praksa Muang, Samutprakarn, Thailand) Airflow to the die was manually controlled to achieve a blowup ratio of about 2:1. The bubble was subsequently collapsed about 0.3 meter (1 foot) above the die, and rolled up. The feed materials were supplied by three conical single screw extruders (obtained under the trade designation LE8-30/C from Labtech Engineering Co., Ltd.) using the process temperatures listed below.

Inside Extruder: 350° F. (177° C.)
Middle Extruder: 350° F. (177° C.)
Outside Extruder: 330° F. (166° C.)
Die Temperature: 350° F. (177° C.)

Film tubes of about 3-inch (7.5 cm) layflat were wound into rolls.

The films were produced using the resins listed in Table 2, below.

TABLE 2

| Resin | Resin Description and Source |
|---|---|
| Resin A | Acid/acrylate-modified ethylene vinyl acetate (EVA) resin (obtained under the trade designation BYNEL 3101 from Dow Chemical Co., Midland, MI) |
| Resin B | Ethylene acrylic acid copolymer resin (obtained under the trade designation NUCREL 3990 from Dow Chemical Co., Midland, MI) |

TABLE 2-continued

| Resin | Resin Description and Source |
|---|---|
| Resin C | Ethylene vinyl acetate copolymer resin (obtained under the trade designation ELVAX 3124 from Dow Chemical Co., Midland, MI) |
| Resin D | Low density polyethylene resin (obtained under the trade designation PETROTHENE NA217000 from LyondellBasell, Houston, TX) |

The films were coextruded with the formulations listed in Table 3, below.

TABLE 3

| Example | Layer 3 | Layer 2 | Layer 1 |
|---|---|---|---|
| Example 1 | Resin B | Resin B | Primer 2 |
| Example 2 | Resin A | Resin A | Primer 2 |
| Example 3 | Resin C | Resins C | Primer 2 |
| Example 4 | Resin D | Resin B | Primer 1 |
| Example 5 | Resin D | Resin B | Primer 3 |
| Example 6 | Resin D | Resin B | Primer 4 |
| Example 7 | Resin D | Resin B | Primer 5 |
| Comparative Example C1 | Resin D | Resin D (no polar-modified polyolefin) | Resin D (no amorphous polyamide) |
| Comparative Example C2 | Resin D | Resin D (no polar-modified polyolefin) | Resin B (no amorphous polyamide) |
| Comparative Example C3 | Resin D | Resin D (no polar-modified polyolefin) | Primer 3 |

Each wound film tube was unrolled and slit along one edge and the film unfolded to produce a 6-inch (15 cm) layflat film (i.e., a coextruded polymeric article).

Examples 8-15

Additionally, seven-layer films were produced on a seven-layer pancake stack die (obtained under the trade designation LF-400 COEX 7-LAYER from Labtech Engineering Co., Ltd., Praksa Muang, Samutprakarn, Thailand).

Airflow to the die was manually controlled to achieve a blow-up ratio of about 2:1. The bubble was subsequently collapsed about 3 meters (10 feet) above the die and rolled up. The feed materials were supplied by 7 independent 20-millimeter (mm) diameter extruders, each with an about 30:1 L/D (length:diameter). The screws feeding each layer had a compression ratio of 3:1 with a Maddock mixing section followed by a Pineapple mixing section.

Processing temperature profiles were as follows for Examples 8-13:

Layer 1 Extruder Temperature: Zone 1: 300° F. (149° C.), Zone 2: 320° F. (160° C.), Zone 3, 320° F. (160° C.)

Layers 2-7 Extruder Temperatures: Zone 1: 325° F. (163° C.), Zone 2: 360° F. (182° C.), Zone 3: 360° F. (182° C.)

Adaptor and Die Temperatures: Adaptor 360° F. (182° C.), Die 360° F. (182° C.).

Example 12 was produced at the same Conditions, however the temperature profile for Layer 1 was as follows:

Layer 1 Extruder Temperature: Zone 1: 280° F. (138° C.), Zone 2: 290° F. (143° C.), Zone 3, 290° F. (143° C.)

Films were produced using the resins listed in Table 2, above, and Table 4, below.

TABLE 4

| Resin | Resin Description and Source |
|---|---|
| Resin E | Ethylene vinyl acetate copolymer resin (obtained under the trade designation ELVAX 3190 from Dow Chemical Company, Midland, MI) |
| Resin F | Diatomaceous earth masterbatched in polyethylene (obtained under the trade designation ABC5000 from Polyfil Corporation, Rockaway, NJ) |
| Resin G | Ethylene acrylic acid copolymer resin (obtained under the trade designation NUCREL 30707 from Dow Chemical Company, Midland, MI) |
| Resin H | Metallocene catalyzed copolymer of propylene and ethylene (obtained under the trade designation VISTAMAXX 6102 from ExxonMobil, Irving, TX) |
| Resin I | Polypropylene copolymer (obtained under the trade designation EXXONMOBIL PP7035 E4 from ExxonMobil, Irving, TX) |
| Resin J | Ethylene and Methyl Acrylate Copolymer (obtained under the trade designation ELVALOY AC 1609 ACRYLATE COPOLYMER from Dow Chemical Company, Midland, MI) |
| Resin K | Ethylene and Methyl Acrylate Copolymer (obtained under the trade designation ELVALOY AC 1330 from Dow Chemical Company, Midland, MI) |
| Resin L | Anhydride-modified ethylene vinyl acetate (obtained under the trade designation BYNEL E418 from Dow Chemical Company, Midland, MI) |
| Resin M | Anhydride-modified polypropylene (obtained under the trade designation BYNEL 50E806 from Dow Chemical Company, Midland, MI) |
| Resin N | Impact modified Polypropylene (obtained under the trade designation TOTAL PP 5571 from Total SA, Courbevoie, France) |

Films were coextruded with the formulations listed in Table 5, below.

TABLE 5

| Ex. | Layer 1 | Layer 2 | Layer 3 | Layer 4 | Layer 5 | Layer 6 | Layer 7 |
|---|---|---|---|---|---|---|---|
| 8 | Primer 2 | Resin B | Resin E | Resin E | Resin E | Resin E | Resin E/Resin F (90:10 wt-%) |

TABLE 5-continued

| Ex. | Layer 1 | Layer 2 | Layer 3 | Layer 4 | Layer 5 | Layer 6 | Layer 7 |
|---|---|---|---|---|---|---|---|
| 9 | Primer 2 | Resin J | Resin D | Resin D | Resin D | Resin D | Resin D |
| 10 | Primer 2 | Resin K | Resin D | Resin D | Resin D | Resin D | Resin D |
| 11 | Primer 2 | Resin L | Resin D | Resin D | Resin D | Resin D | Resin D |
| 12 | Primer 6 | Resin G | Resin D | Resin D | Resin D | Resin D | Resin D |
| 13 | Primer 2 | Resin M | Resin N/ Resin H (4:1 by wt.) | Resin N/ Resin H (4:1 by wt.) | Resin N/ Resin H (4:1 by wt.) | Resin I | Resin I |
| 14 | Primer 2/ Resin G (60:40 wt-%) | Resin G | Resin D | Resin D | Resin D | Resin D | Resin D |
| 15 | Primer 2/ Resin A (50:50 wt-%) | Resin G | Resin D | Resin D | Resin D | Resin D | Resin D |

T-peel testing was performed on each of Examples 1-15 as well as on each of Comparative Examples C1-C3 to determine adhesive anchorage performance for each film as follows:

Test specimens were prepared by adhering a 12-inch (30 cm) length of adhesive tape (obtained under the trade designation "SCOTCH MAGIC TAPE" from 3M Company, St. Paul, MN) to each coextruded polymeric multilayer film specimen and rolling down with a 2.2-pound (1 kilogram) roller. The test specimen was then aged for 18 hours under constant temperature and humidity (22° C. and 50% Relative Humidity (RH)) conditions. The tape was then removed from the film via a t-peel (90° peel) test on a Peel Tester (obtained under the trade designation "IMASS SP-102C-3M90" from IMASS, Inc., Accord, MA) at 90 inch/minute (230 centimeter/minute).

The peel removal force and failure mode were recorded for three replicates of each specimen. Preferably, the desired peel removal force is at least 10 ounces per 0.5 inch (0.22N/mm). Preferably, the desired failure mode is "adhesive split" showing that the bond to the amorphous polyamide primer (Layer 1) is greater than the internal strength of the adhesive. An "adhesive failure" mode is an undesirable failure mode and occurs when the adhesive debonds from the coextruded polymeric film indicating poor anchorage of the adhesive to the backing (Comparative Examples C1 and C2). In certain embodiments, "film splitting" is also an undesirable failure mode, as this is caused by delamination of the film due to insufficient bonding between internal layers of the film backing (Examples 9 and 10, which demonstrate good peel removal force and no adhesive failure). The average peel removal force values and failure mode for each coextruded polymeric multilayer film are reported in Table 6, below.

TABLE 6

| Multilayer Film Specimen | Peel Removal Force, ounce/0.5 inch (N/mm) | Failure Mode |
|---|---|---|
| Example 1 | 20.2 (0.44) | Adhesive split |
| Example 2 | 21.2 (0.46) | Adhesive split |
| Example 3 | 18.9 (0.41) | Adhesive split |
| Example 4 | 18.3 (0.40) | Adhesive split |
| Example 5 | 19.1 (0.42) | Adhesive split |
| Example 6 | 19.4 (0.42) | Adhesive split |
| Example 7 | 19.3 (0.42) | Adhesive split |
| Example 8 | 14.2 (0.31) | Adhesive split |
| Example 9 | 15.1 (0.33) | Film splitting |
| Example 10 | 18.4 (0.40) | Film splitting |
| Example 11 | 21.2 (0.46) | Adhesive split |
| Example 12 | 19.6 (0.43) | Adhesive split |
| Example 13 | 18.9 (0.41) | Adhesive split |

TABLE 6-continued

| Multilayer Film Specimen | Peel Removal Force, ounce/0.5 inch (N/mm) | Failure Mode |
|---|---|---|
| Comparative Example C1 | 4.2 (0.09) | Adhesive failure |
| Comparative Example C2 | 6.8 (0.15) | Adhesive failure |
| Comparative Example C3 | 2.3 (0.05) | Film splitting |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An adhesive article comprising:
   a coextruded polymeric backing comprising:
      a first layer comprising an amorphous polyamide comprising an epoxide chain-extended polyamide, the first layer having first and second opposing major surfaces; and
      a second layer comprising a polar-modified polyolefin comprising a grafted polyolefin comprising (i) a polyolefin and (ii) one or more grafted polar groups in an amount of 0.1-8 wt-%, based on the total weight of the grafted polyolefin, the second layer having first and second opposing major surfaces;
      wherein the first major surface of the second layer is in contact with the second major surface of the first layer; and
   an acrylic pressure sensitive adhesive layer in contact with the first major surface of the first layer of the backing.

2. The adhesive article of claim 1, wherein the amorphous polyamide is present in an amount in a range of 50 to 100 weight percent, based on the total weight of the first layer.

3. The adhesive article of claim 1, wherein the polar-modified polyolefinfurther comprises a copolymer of an olefin and one or more polar comonomers.

4. The adhesive article of claim 3, wherein the olefin to the one or more polar comonomers weight ratio is in a range of 97:3 to 70:30.

5. The adhesive article of claim 3, wherein the one or more polar comonomers comprise at least one monomer selected from the group of vinyl acetate, methyl acetate, acrylic acid, methacrylic acid, methyl acrylate, ethyl acrylate, butyl acrylate, glycidyl methacrylate, carbon monoxide, and a mixture thereof.

6. The adhesive article of claim 1, wherein the grafted polar groups comprise maleic anhydride groups.

7. The adhesive article of claim 1, wherein the polar-modified polyolefin is present in an amount in a range of 60 to 100 weight percent, based on the total weight of the second layer.

8. The adhesive article of claim 1, wherein the polar-modified polyolefin further comprises a polyolefin, one or more polar comonomers, and one or more grafted polar groups.

9. The adhesive article of claim 1, wherein the coextruded polymeric backing has an average thickness in a range of 10 to 500 micrometers.

10. The adhesive article of claim 1, wherein the first layer has an average thickness in a range of 1 to 70 micrometers.

11. The adhesive article of claim 1, wherein the second layer has an average thickness in a range of 1 to 70 micrometers.

12. The adhesive article of claim 1, wherein the coextruded polymeric backing further includes a third layer disposed on the second layer, the third layer having first and second opposing major surfaces, wherein the first major surface of the third layer contacts the second major surface of the second layer.

13. The adhesive article of claim 1, wherein at least one of the first layer or the second layer further comprises at least one of an antioxidant, an antiblock agent, an ultraviolet absorber (UVA), a hindered amine light stabilizer, a surfactant, an antistatic agent, a release agent, a slip additive, an ink or paint receptive material, an abrasion resistant material, a pigment, a dye, or metallic particles.

* * * * *